(12) United States Patent
Takata et al.

(10) Patent No.: US 7,622,873 B2
(45) Date of Patent: Nov. 24, 2009

(54) MOTOR DRIVE DEVICE AND DRIVE METHOD

(75) Inventors: Go Takata, Hyogo (JP); Hideaki Mori, Hyogo (JP); Yasunori Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 351 days.

(21) Appl. No.: 11/548,495

(22) Filed: Oct. 11, 2006

(65) Prior Publication Data

US 2007/0126383 A1   Jun. 7, 2007

(30) Foreign Application Priority Data

Oct. 11, 2005   (JP) .............................. 2005-296378

(51) Int. Cl.
*H02P 29/04* (2006.01)
(52) U.S. Cl. ........................ 318/362; 318/375; 318/432; 363/41; 363/42
(58) Field of Classification Search ................. 318/362, 318/375, 376, 432, 434; 363/41, 42
See application file for complete search history.

(56) References Cited

U.S. PATENT DOCUMENTS

| 3,719,873 | A | * | 3/1973 | Graf ............................ 318/798 |
| 5,309,078 | A | | 5/1994 | Cameron |
| 5,375,028 | A | * | 12/1994 | Fukunaga .................. 361/93.7 |
| 5,436,819 | A | * | 7/1995 | Mikami et al. ................. 363/41 |

* cited by examiner

*Primary Examiner*—Rina I Duda
(74) *Attorney, Agent, or Firm*—RatnerPrestia

(57) ABSTRACT

A reverse current detection unit detects the direction of the motor current during the synchronous rectifier period based on the polarity of the on voltage of a switching device contained in the motor current path, and outputs a reverse current detection signal representing the result of this detection to the PWM control unit. Change in the output of the PWM control unit that generates the drive signal for a particular switching device in the drive unit is controlled based on the reverse current detection signal and the energizing pattern of the drive unit is changed when motor current is detected in the synchronous rectifier period to be flowing in the opposite direction as in the urging period. The flow of motor current to the power supply is thus reduced and a rise in the power supply voltage can be prevented.

8 Claims, 12 Drawing Sheets

70

MOTOR DRIVE DEVICE AND DRIVE METHOD

BACKGROUND OF THE INVENTION

1. Field of Invention

The present invention relates to technology for preventing a rise in the power supply voltage in a drive circuit for driving a motor.

2. Description of Related Art

Pulse width modulation (PWM) drive methods that control energizing the motor coil by controlling the on/off state of specific switching devices in the motor drive circuit are commonly used to drive brushless motors in AV equipment. U.S. Pat. No. 5,309,078 (corresponding to Japanese Unexamined Patent Appl. Pub. H5-211780, and E.P. Publication No. 525, 999), for example, teaches a widely used synchronous rectifier PWM drive technology for achieving low loss and high efficiency PWM drive.

The PWM drive technology taught in U.S. Pat. No. 5,309, 078 is described more fully below with reference to FIG. 15. FIG. 15 shows part of a three-phase motor system that is driven by a drive unit 305 composed of a three-phase bridge.

The voltage detected by detection resistance 324 and torque control signal VREF are input respectively to the inverted Input node and the non-inverted input node of comparator 335. The torque control signal VREF sets the motor torque. The output node of the comparator 335 is connected to flip-flop circuit 336, and the inverted output of the flip-flop circuit 336 is input to two-phase non-superimposed clock generating unit 368. The two-phase non-superimposed clock generating unit 366 generates a pulse pair with a specific timing offset between the rising and falling edges in order to prevent current shoot-through in the drive unit 305. The output of the two-phase non-superimposed clock generating unit 368 is input to the energizing control unit 339 and synchronous rectifier control unit 340. The energizing control unit 339 supplies the drive signals that control the switching devices 325A, 325B, 325C to the high potential switching devices 325A, 325B, 325C, and the synchronous rectifier control unit 340 supplies the drive signals that control the low potential switching devices 326A, 326B, 326C to the low potential switching devices 326A, 326B, 326C.

Operation of this motor drive device is described next. The urging period is the period when drive power is supplied from the power source VM to the motor coils 310, 311, 312 by controlling the on state of the source phase (the phase in which motor current flows to the motor coil) high potential switching devices and the sink phase (the phase in which motor current flows from the motor coil) low potential switching devices.

The regeneration period is the period in which the motor current flowing to the motor coil circulates through the source phase low potential side switching device or the diode parallel connected to the source phase low potential side switching device, and a sink phase low potential side switching device. The drive unit 305 controls energizing the motor coils 310, 311, 312 through one cycle including an urging period and a regeneration period. The urging period and regeneration period include the offset timing generated by the two-phase non-superimposed clock generating unit.

For example, during the urging period node A is driven HIGH by high potential switching device 325A, node B is driven LOW by low potential switching device 326B, and node C is held in a high impedance state with both switching devices 325C and 326C off.

The motor current flowing through motor coils 310 and 311 between nodes A and B is converted to voltage by detection resistance 324. This voltage is compared by the comparator 335 with torque control signal VREF. If the voltage is greater than torque control signal VREF, the output of comparator 335 sets the flip-flop circuit 336 from which the inverted output is input to the two-phase non-superimposed clock generating unit 368. As a result, the output of the two-phase non-superimposed clock generating unit 368 is inverted, the energizing control unit 339 turns the switching device 325A on the high potential side of node A off, and synchronous rectifier control unit 340 turns the switching device 326A on the low potential side of node A on. At the same time the discharge circuit 341 releases switch 342 from specific voltage VS to start discharging. The discharge circuit 341 produces a time delay during which the high potential switching devices 325A, 325B, 325C are held off. When the capacitance voltage of the discharge circuit 341 becomes less than torque control signal VREF, the comparator 343 resets the flip-flop circuit 336, and again turns on the high potential switching device corresponding to the phase being driven.

As described above, if the low potential switching device 326A turns on when the high potential switching device 325A is off, the drive unit 305, and more particularly the motor coils 310 and 311, are shorted by two resistances, specifically the on resistors of low potential switching devices 326A and 326B. The motor current flows through a motor current path including motor coils 310 and 311 and switching devices 326A and 326B without passing any diodes. The current path carrying the motor current through motor coils 310 and 311 can therefore reduce the voltage drop on the current path more than is possible with current regeneration using diodes. Low loss and high efficiency can thus be achieved. This method of turning one switching device of a predetermined phase on during the regeneration period in which another switching device in the same predetermined phase is off is referred to as synchronous rectifier control. The period in which synchronous rectifier control is applied is called the synchronous rectifier period.

Some problems with this related art are described below. More particularly, some problems with the current-controlled PWM drive method taught in U.S. Pat. No. 5,309,078 are described below with reference to FIG. 16 and FIG. 17. FIG. 16 shows the phase A portion of the drive unit 305, the phase A motor coil 310, and the detection resistance 324 shown in FIG. 15. Reference EA denotes a back electromotive force-back electromotive force produced in the phase A motor coil proportionally to the rotational speed of the motor.

What happens when node A in FIG. 15 is driven HIGH by high potential switching device 325A, node B is driven low by low potential switching device 326B, switching devices 325C and 326C are off and node C is in a high impedance state, and torque control signal VREF is changed from a relatively high level (where back electromotive force EA is relatively high) to an extremely low level is considered below.

FIG. 17 is a timing chart describing the operation shown in FIG. 16. Periods T1 and T4 in FIG. 17 are the urging period in which drive power is supplied from the power source VM to the motor coil 310 through the phase A high potential switching device 325A, and periods T2 and T3 are the synchronous rectifier period in which motor current flows through the phase A low potential switching device 326A.

If torque control signal VREF falls sharply due to a reduce speed command, motor current IA1, which flows through phase A when the phase A high potential switching device is on, goes in a short time (period T1 in FIG. 17) to the maximum current IP level allowed by torque control signal VREF.

As a result, the phase A high potential switching device goes off and the phase A low potential switching device goes on in a synchronous rectifier state, and motor current starts flowing as denoted by IA2 (in period T2 in FIG. 17). However, because the maximum current IP is low and the back electromotive force EA is high, the effect of the back electromotive force EA causes the motor current to start flowing in the opposite direction, that is, in the direction of IA3 (period T3 in FIG. 17). The back electromotive force EA also causes the motor current IA3 to rise during the synchronous rectifier period, which is longer than the urging period due to the reduce speed command. As a result, when the synchronous rectifier period ends, that is, when the phase A high potential switching device is on and the phase A low potential switching device is off, motor current IA4 flows back to the power source and causes the power supply voltage to rise (period T4 in FIG. 17).

While not shown in FIG. 17 for brevity, motor current flows through diode 327A back to the power supply during the shoot-through prevention period after the synchronous rectifier period ends, that is, when both high and low potential side switching devices for phase A are off.

A problem with the regeneration phase of the related art is that because motor current flows back to the power source when the synchronous rectifier period ends, the power supply voltage rises and can lead to device damage. Reducing device size and cost is also difficult with the related art because a capacitance to improve the current sink capacity of the power supply, a zener diode for voltage clamping, or some other external protection device is required to prevent a rise in the power supply voltage.

The problem of the power supply voltage rising after the synchronous rectifier period due to motor current flowing in the opposite direction as during the urging period is not limited to this method of PWM drive based on controlling the peak motor current, and the same problem is caused by speed reducing torque control and load changes in any motor drive method that uses PWM drive with synchronous rectifier control. In so-called voltage-controlled PWM drive methods, for example, that are based on comparing a carrier wave having a sinusoidal, trapezoidal, or similar waveform with a modulation wave having a triangular wave, sawtooth wave, or similar waveform, the power supply voltage also rises at the end of the synchronous rectifier period because speed reducing torque commands and load variations also cause the PWM duty ratio to drop and motor current to flow during the synchronous rectifier period in the opposite direction as during the urging period.

SUMMARY OF THE INVENTION

The present invention is directed to solving this problem by preventing a power supply voltage rise caused by motor current flowing back to the power supply.

A motor drive device according to a preferred aspect of the present invention is a motor drive device operable to supply drive power to a motor by switching repeatedly between an urging state and a regeneration state, and has a drive signal generator operable to generate a drive signal, a driver operable to produce the drive power based on the drive signal, and a reverse current detector operable to detect when the direction of motor current flowing through the motor reverses in the regeneration state and to generate a reverse current detection signal. Said drive signal generator controls the logic level of the drive signal based on this reverse current detection signal.

A motor drive method according to another aspect of the invention is a method of supplying drive power to a motor by switching repeatedly between an urging state and a regeneration state, and has steps of generating a drive signal, producing the drive power based on the drive signal, detecting when the direction of motor current flowing through the motor reverses in the regeneration state and generating a reverse current detection signal, and controlling the logic level of the drive signal based on this reverse current detection signal.

The motor drive device and drive method of the invention sense phenomena that cause the power supply voltage to rise instead of detecting the actual rise in the power supply voltage caused by motor current backflow to the power supply, and can therefore prevent the power supply voltage from rising. The supply voltage therefore does not rise even when a sudden reduce speed command is asserted or there is a load change, and damage to switching devices can be prevented.

Furthermore, the size and cost of the motor drive device can also be reduced because devices such as capacitors or zener diodes to cope with a power supply voltage rise are not needed.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Preferred embodiments of a motor drive device according to the present invention are described below with reference to the accompanying figures. The numbers used in the following description of the invention are used by way of example only to describe the invention in detail, and the invention is not limited to these values.

First Embodiment

A motor drive device according to this first embodiment of the invention drives a three-phase motor by supplying drive power operable to drive the motor based on PWM (pulse width modulation) control of each phase coil of the motor.

Three series circuits each having a high potential side switching device and low potential side switching device connected in series are parallel connected in the drive unit 10A of this motor drive device 1. This motor drive device detects the on voltage of the switching devices included in the current path of the motor current formed in the regeneration period. The detected on voltage is then compared with a predetermined voltage, and a reverse current detection signal is generated based on the result of this comparison. The reverse flow of motor current to the power supply due to a sudden speed reduction command or load variation can be prevented, and a power supply voltage rise that could result in damage to other circuit elements can be prevented, by controlling the energized state of the drive unit based on this reverse current detection signal.

Figure 1:
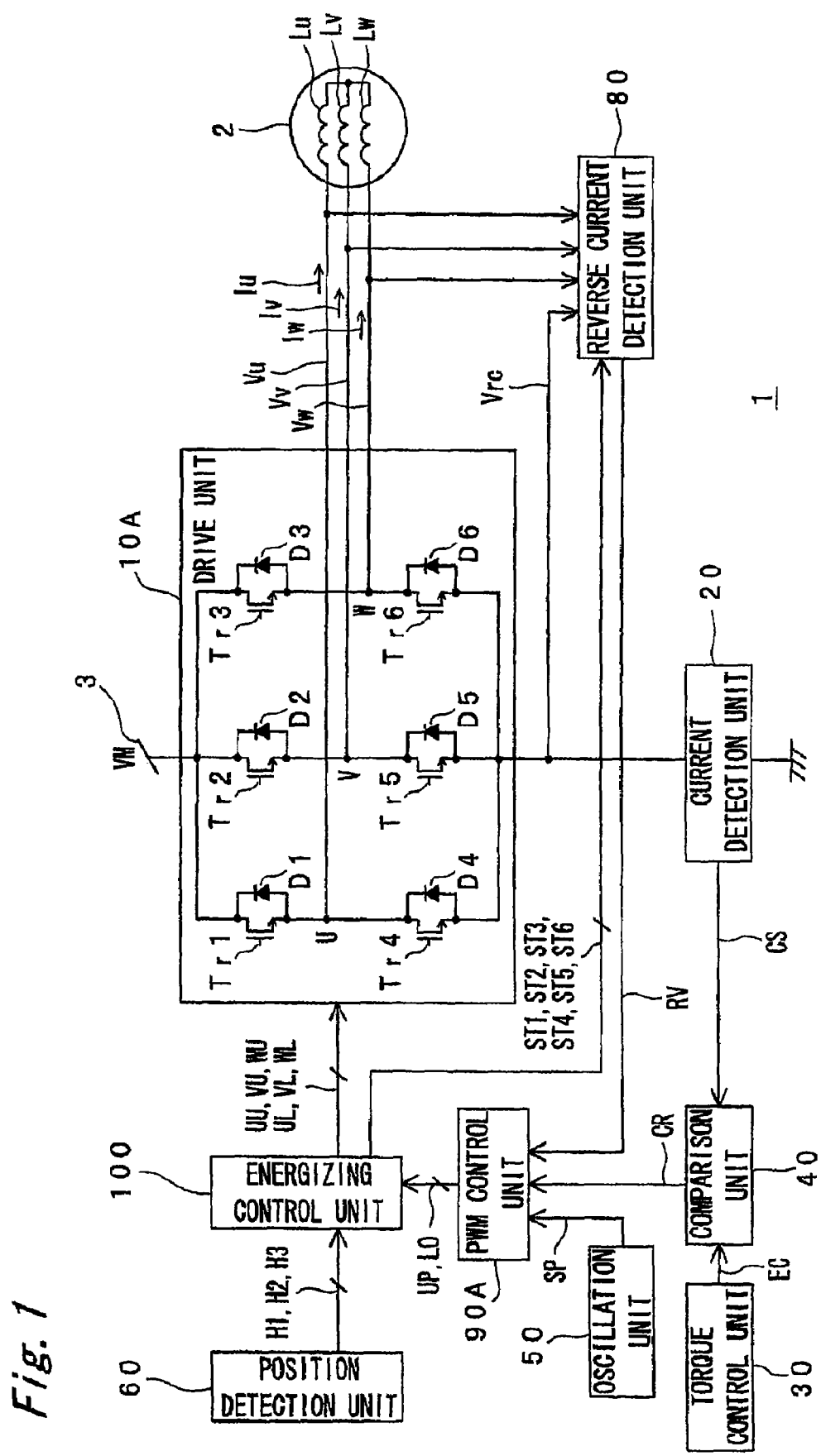
FIG. 1 is a block diagram of a motor drive device 1 according to a first embodiment of the invention.

The first embodiment of the invention is described with reference to FIG. 1 to FIG. 5. FIG. 1 is a block diagram of the motor drive device 1 in this first embodiment of the invention. As shown in FIG. 1, the motor drive device 1 includes a power supply 3, a drive unit 10A, a current detection unit 20, a torque control unit 30, a comparison unit 40, an oscillation unit 50, a position detection unit 60, a reverse current detection unit 80, a PWM control unit 90A, and an energizing control unit 100, and drives a motor 2.

The motor 2 that is driven by this motor drive device 1 has a rotor and a stator. The rotor has a field unit rendered by a permanent magnet not shown. The stator has motor coils Lu, Lv, Lw for phase U, phase V, and phase W in a Y-connection.

The drive unit 10A is connected between ground and the power supply 3 of voltage VM, and is composed of three parallel half-bridge circuits each having a high potential side switching device and low potential side switching device connected in series.

In this drive unit 10A the half-bridge circuit that controls energizing motor coil Lu is composed of switching device Tr1 connected on the high potential side and switching device Tr4 connected on the low potential side, the half-bridge circuit that controls energizing motor coil Lv is composed of switching device Tr2 connected on the high potential side and switching device Tr5 connected on the low potential side, and the half-bridge circuit that controls energizing motor coil Lw is composed of switching device Tr3 connected on the high potential side and switching device Tr6 connected on the low potential side.

These switching devices Tr1, Tr2, Tr3, Tr4. Tr5, Tr6 switch according to the logic level of the drive signals UU, VU, WU, UL, VL, WL (referred to as drive signals UU-WL below) respectively output thereto from the energizing control unit 100 to produce the drive power for driving the motor 2. The high potential side switching devices Tr1, Tr2, Tr3 are respectively controlled by high potential drive signals UU, VU, WU, and the low potential side switching devices Tr4, Tr5, Tr6 are respectively controlled by low potential drive signals UL, VL, WL.

A MOS transistor bipolar transistor, or insulated gate bipolar transistor (IGBT), for example, can be used for switching devices Tr1 to Tr6. In this embodiment of the invention switching devices Tr1 to Tr6 are n-channel MOS transistors.

When switching devices Tr1 to Tr6 are on (in the operating state), the logic level of the drive signals UU-WL is at the operating level, which in this first embodiment of the invention is HIGH. When switching devices Tr1 to Tr6 are off (in the non-operating state), the logic level of the drive signals UU-WL is at the non-operating level, which in this first embodiment of the invention is LOW.

The current detection unit 20 is connected between ground and the drive unit 10A, detects the amount of current flowing through the drive unit 10A, and outputs current detection signal CS denoting the result to the comparison unit 40.

The torque control unit 30 outputs the torque control signal EC that sets the amount of torque applied to the motor 2 to the comparison unit 40. The torque control unit 30 is also referred to as a torque control signal generating unit.

The comparison unit 40 then compares the torque control signal EC and current detection signal CS, and outputs reset signal CR representing the result to the PWM control unit 90A.

The oscillation unit 50 outputs set signal SP, which is a pulse signal of a specific frequency, to the PWM control unit 90A.

The reverse current detection unit 80 is parallel connected to all low potential side switching devices of the drive unit 10A, and the energizing state signals ST1, ST2, ST3, ST4, ST5, ST6 representing the energized state of the motor 2 are input to the reverse current detection unit 80 from the energizing control unit 100.

The energizing control unit 100, PWM control unit 90A, and oscillation unit 50 render a drive signal generating unit.

The reverse current detection unit 80 outputs to the PWM control unit 90A a reverse current detection signal RV indicating whether the direction of motor current passing through the motor coils Lu, Lv, Lw in the synchronous rectifier period reversed.

Based on the set signal SP, reset signal CR, and reverse current detection signal RV, the PWM control unit 90A generates and outputs to the energizing control unit 100 a high potential side drive signal UP and a low potential side drive signal LO for a desired phase where both drive signals have a non-superimposed period for preventing drive unit 10A shoot-through.

The position detection unit 60 outputs position detection signals H1, H2, H3 representing the position of the motor 2 rotor to the energizing control unit 100.

The energizing control unit 100 generates the energizing state signals ST1 to ST6 indicating the energized state of the motor 2 based on the position detection signals H1, H2, H3, and outputs the energizing state signals ST1 to ST6 to the reverse current detection unit 80.

The phase in which motor current is supplied to the motor coil is called the "source phase" below and the motor current at this time is called the "source current," and the phase in which motor current flows from the motor coil is called the "sink phase" and the motor current at this time is called the "sink current."

The urging period is the period in which drive power is supplied from the power supply 3 to the motor coils Lu, Lv, Lw by controlling the source phase high potential side switching device and sink phase low potential side switching device on. The operating state of the motor drive device in this urging period is the "urging state."

The regeneration period is the period in which the source phase high potential side switching device that was on during the urging period is off. During the regeneration period the motor current flowing through the motor coil passes through the low potential side switching device that is on in the source phase or a diode parallel connected to this switching device, and the low potential side switching device of the sink phase. The operating state of the motor drive device in this regeneration period is the "regeneration state."

The urging state and regeneration state thus repeat in cycles composed of an urging period and a regeneration period as the motor drive device in this embodiment of the invention controls energizing the motor coils Lu, Lv, Lw. The urging period or regeneration period includes a non-superimposed period to prevent drive unit 10A shoot-through, but the non-superimposed period can be shorter than the urging period or regeneration period and is omitted in the following description unless otherwise noted. More particularly, control whereby the low potential side switching device of the source phase that is on in the urging period is on in the regeneration state of the regeneration period so that the motor current passes through the low potential side switching device of the sink phase and this lower resistance low potential side switching device of the source phase instead of a diode is called "synchronous rectifier control." The period in which synchronous rectifier control is applied is called the synchronous rectifier period.

A motor drive device according to this embodiment of the invention applies motor current at a current level determined by the torque control signal EC to a desired phase as the source current (or sink current) for a 120° electrical angle period. The coil is not energized for the next 60° period, and the current level goes to zero. The sink current (or source current) is then applied next in the same energizing pattern. A rectangular wave phase current is thus applied with a 120° electrical angle shift between each of the three phases. At any particular time the source current is therefore supplied to one phase (the source phase) and the sink current is supplied to another phase (the sink phase). As a result, two phases are energized and the remaining one phase is not energized in an energizing pattern referred to below as a "120° energizing method."

Based on position detection signals H1, H2, H3, the energizing control unit 100 determines the two energized phases with one phase being the source phase and another phase being the sink phase. The energized phases are determined every 60° electrical angle period. When the source phase is driven by PWM, so-called synchronous rectifier control turns the low potential side switching device on for a predetermined period to prevent shoot-through after the high potential side switching device is turned off in the regeneration period in which the high potential side transistor is off. In the sink phase, the high potential side switching device is always off, the low potential side switching device is on, and both the high potential side and low potential side switching devices are off for the remaining phase that is not energized.

The operation of each element in the motor drive device according to this embodiment of the invention is described below.

The drive unit 10A is composed of six switching devices Tr1 to Tr6 in a bridge connection, and a diode D1, D2, D3, D4, D5, D6 is inversely parallel connected to each of the switching devices Tr1 to Tr6. One terminal of motor coil Lu is connected to the node between switching device Tr1 and switching device Tr4, one terminal of motor coil Lv is connected to the node between switching device Tr2 and switching device Tr5, and one terminal of motor coil Lw is connected to the node between switching device Tr3 and switching device Tr6 in this drive unit 10A. The switching devices Tr1 to Tr6 switch on/off according to the logic level of the drive signals UU-WL from the energizing control unit 100, and supply PWM switched drive power from the power supply 3 to the motor coils Lu, Lv, Lw.

The current detection unit 20 includes a detection resistance and amplifier, for example, and detects the amount of current flowing from the drive unit 10A as a voltage. The detected result is output to the comparison unit 40 as current detection signal CS.

The torque control unit 30 outputs a torque control signal EC, which denotes the target level for how much torque should be applied to the motor 2, to the comparison unit 40.

The comparison unit 40 compares the level of this torque control signal EC with the level of the current detection signal CS and outputs reset signal CR as the result to the PWM control unit 90A. The comparison unit 40 is a comparator, for example.

The oscillation unit 50 outputs a set signal SP to the PWM control unit 90A. This set signal SP is a timing signal for setting one of high potential side drive signals UU, VU, WU.

The oscillation unit 50 is a phase-locked loop, for example. The PWM frequency of the set signal SP can be a constant frequency or a variable frequency that changes with the torque control signal EC level, for example.

The position detection unit 60 outputs position detection signals H1, H2, H3 denoting the position of the rotor in the three phases of the motor 2 to the energizing control unit 100. The position detection signals H1, H2, H3 can be generated using Hall effect devices or other sensors, or by a sensorless arrangement using the back electromotive force produced in the motor coils Lu, Lv, Lw, and the detection arrangement is not specifically limited. The position detection signals H1, H2, H3 correspond to the rotor position in each of the three phases, and are therefore signals with a 120° electrical angle offset between each signal.

The reverse current detection unit 80 detects the on voltage polarity of a specific low potential side switching device in the synchronous rectifier period based on the drain-source voltage of the low potential side switching devices Tr4, Tr5, Tr6 for each phase in the drive unit 10A and the energizing state signals ST1 to ST6 denoting the energized state of the motor coils Lu, Lv, Lw, and outputs a reverse current detection signal RV denoting the direction of motor current flow in the synchronous rectifier period. The reverse current detection unit 80 outputs the reverse current detection signal RV to the PWM control unit 90A.

Figure 2:
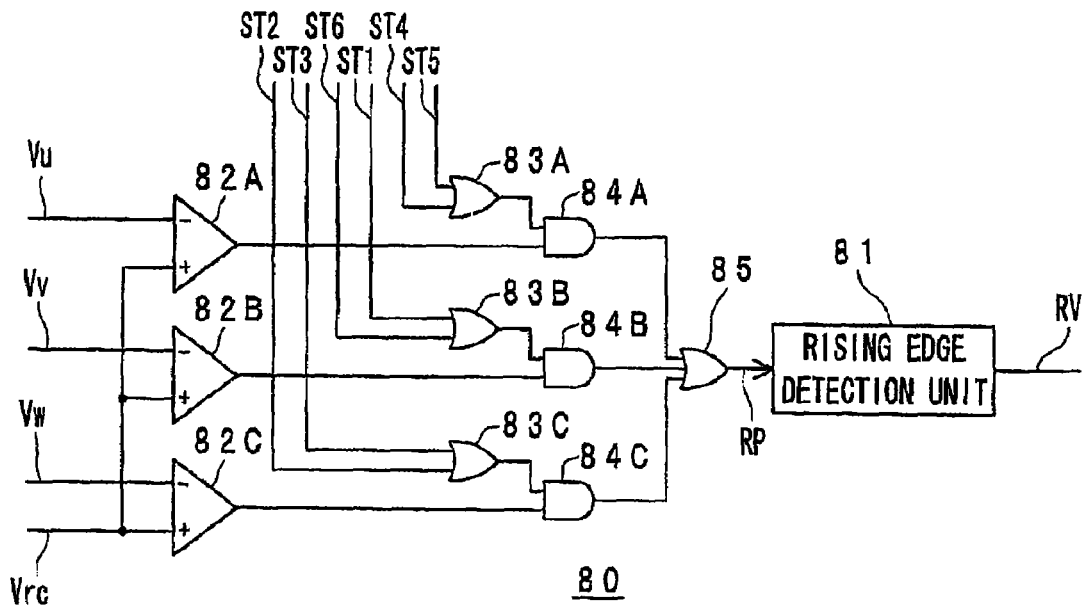
FIG. 2 is a circuit diagram of the reverse current detection unit 80 in FIG. 1.
Figure 3:
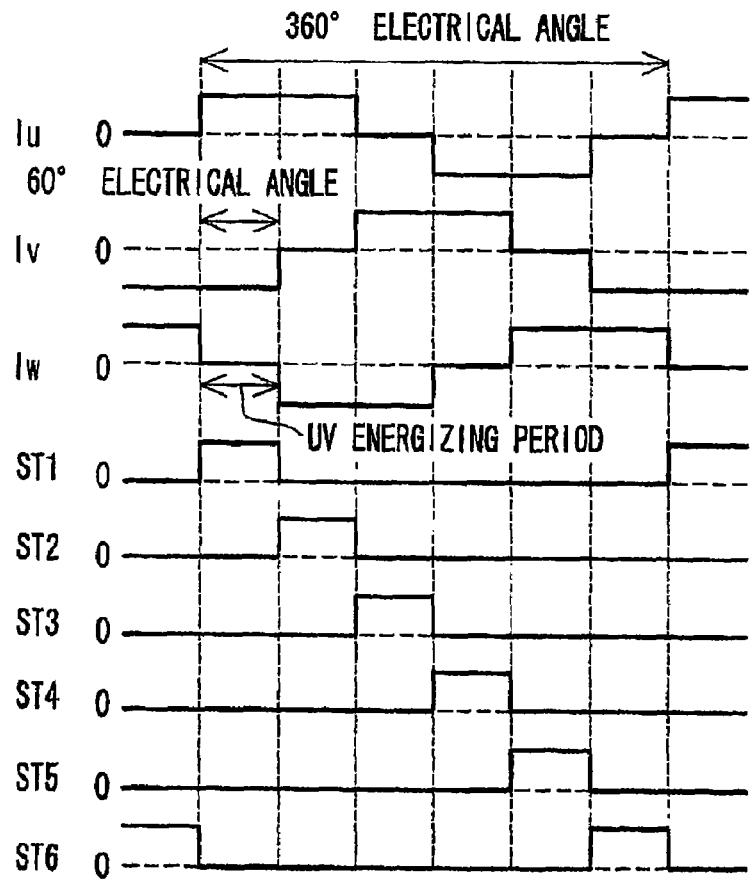
FIG. 3 is a timing chart describing the relationship between the energizing states of the drive unit 10A shown in FIG. 1 and the energizing state signals ST1 to ST6.

FIG. 2 is a circuit diagram showing a specific arrangement of the reverse current detection unit 80. FIG. 3 is a timing chart describing the relationship between the energized states of the drive unit 10A and the energizing state signals ST1 to ST6. As shown in FIG. 3, in the 60° electrical angle period (called the "UV energizing period" below) in which the U phase current is the source current, the V phase current is the sink current, and the W phase current is zero, the logic level of energizing state signal ST1 output from the energizing control unit 100 is HIGH, and energizing state signals ST2 to ST6 sequentially go HIGH in each subsequent 60° electrical angle period following the UV energizing period.

The reverse current detection unit 80 shown in FIG. 2 includes a rising edge detection unit 81 and comparators 82A, 82B, 82C.

The rising edge detection unit 81 outputs the reverse current detection signal RV of a predetermined pulse width when pulse signal RP goes from LOW to HIGH.

The motor terminal voltages Vu, Vv, Vw for each phase are respectively input to the inverted input nodes of the comparators 82A, 82B, 82C. The common source voltage Vrc of the low potential side switching devices Tr4, Tr5, Tr6 for each phase in the drive unit 10A are input to the non-inverting input nodes of the comparators 82A, 82B, 82C.

Operation in the UV energizing period (when ST1 is HIGH) is described by way of example.

If the voltage difference of the source voltage Vrc and drain voltage Vv of low potential side switching device Tr5 in the drive unit 10A is positive, that is, the on voltage of the low potential side switching device Tr5 is negative in the UV energizing period, the output of comparator 82B goes HIGH. As a result, the pulse signal RP goes HIGH and a reverse current detection signal RV of a predetermined pulse width is output.

In order for the reverse current detection signal RV to go HIGH, the motor current passing the V phase low potential side switching device Tr5 changed from the sink current to the source current and the direction of motor current Iu and Iv passing motor coils Lu and Lv reversed in the synchronous rectifier period of the UV energizing period. In addition to the UV energizing period, the reverse current detection signal RV also goes HIGH if the direction of the motor current reverses in the synchronous rectifier period of any energizing period in which any energizing state signal ST2 to ST6 is HIGH.

Comparator output could also be configured to change when the on voltage of the low potential side switching device for any phase drops below a predetermined level by applying a known offset to the comparators 82A, 82B, 82C. Producing the reverse current detection signal RV based on comparator output in this arrangement affords the same effect.

The motor drive device according to this first embodiment of the invention applies synchronous rectifier control by controlling the low potential side switching device of the set source phase in the urging period and the low potential side switching device of the sink phase in the urging period on in the regeneration period. When synchronous rectifier control is applied by controlling the high potential side switching device of the set source phase in the urging period and the high potential side switching device of the sink phase in the urging period on in the regeneration period, whether the direction of motor current flow during the synchronous rectifier period is opposite the direction during the urging period can be detected by detecting the polarity of the on voltage of the high potential side switching device. In this situation the reverse current detection unit 80 is parallel connected to high potential side switching devices Tr1, Tr2, Tr3, the motor terminal voltages Vu, Vv, Vw for each phase are input to the non-inverted input nodes of comparators 82A, 82B, 82C, and the drain nodes of Tr1, Tr2, Tr3 are input to the inverted input nodes.

Figure 4:
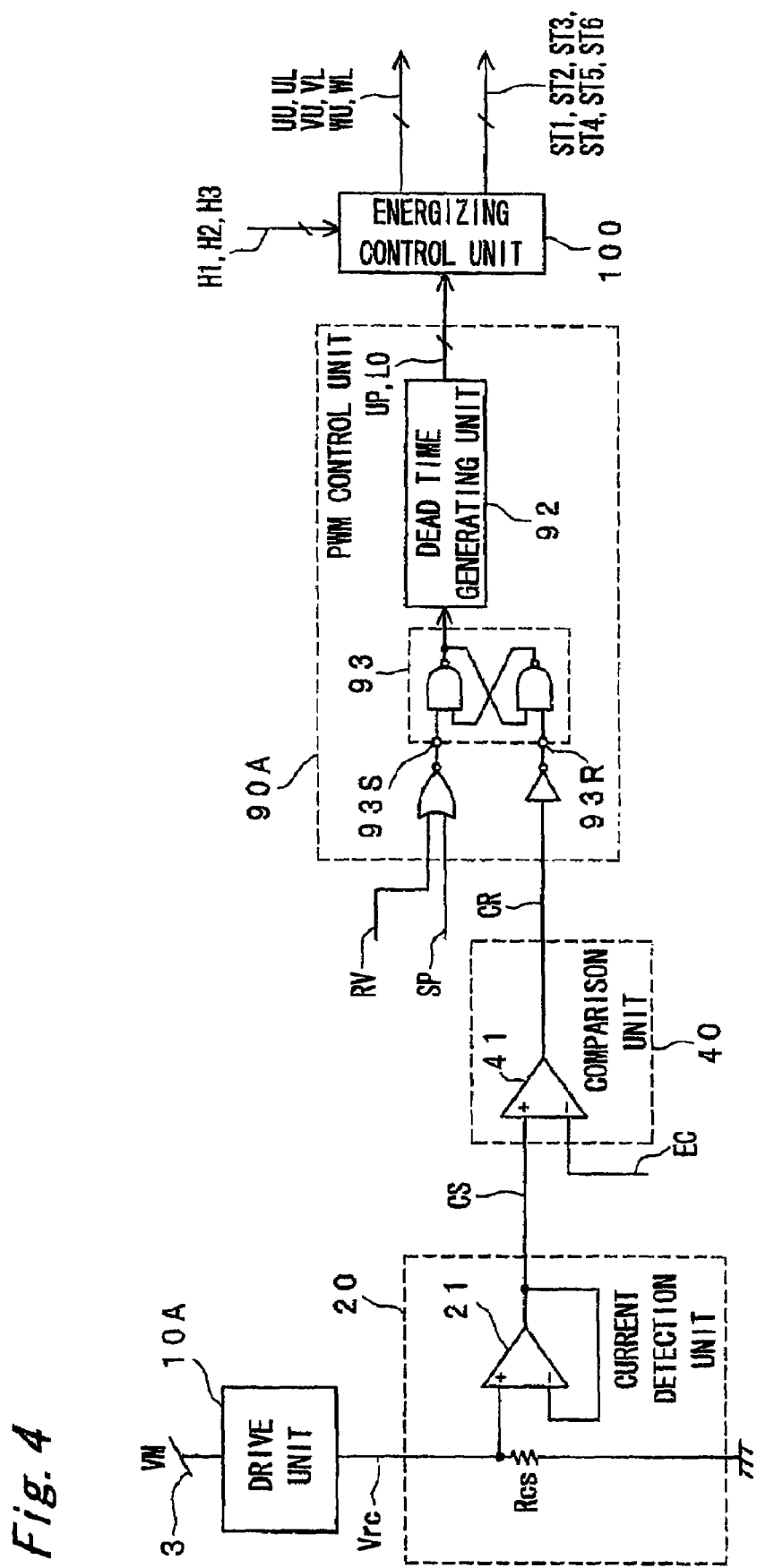
FIG. 4 is a circuit diagram showing a specific arrangement of the PWM control unit 90A, the current detection unit 20, and the comparison unit 40 in FIG. 1.

FIG. 4 is a circuit diagram showing the arrangement of the PWM control unit 90A, current detection unit 20, and comparison unit 40. The current detection unit includes a detection resistance Rcs and amplifier 21. The comparison unit 40 includes comparator 41. The PWM control unit 90A includes dead time generating unit 92 and flip-flop 93.

The amplifier 21 detects the potential difference between the ends of the detection resistance Rcs connected between the drive unit 10A and ground, and outputs the result as current detection signal CS to the non-inverted input node of the comparator 41. The torque control signal EC is input to the inverted input node of the comparator 41.

The comparator 41 outputs a reset signal CR denoting the result of the comparison. The reset signal CR is then inverted and applied to the reset pin 93R of the flip-flop 93. The NOT-OR of the reverse current detection signal RV and set signal SP is applied to the set pin 93S of the flip-flop 93.

Based on the output from the flip-flop 93, the dead time generating unit 92 produces high potential side drive signal UP and low potential side drive signal LO for a selected phase where both drive signals have a non-superimposed period to prevent drive unit 10A shoot-through, and outputs drive signals UP and LO to the energizing control unit 100.

Based on the high potential side drive signal UP, low potential side drive signal LO, and position detection signals H1, H2, H3, the energizing control unit 100 generates and outputs to the drive unit 10A drive signals UU-WL for 120° energizing. During the UV energizing period, for example, high potential side drive signal UP and low potential side drive signal LO are output to the drive unit 10A as drive signals UU and UL applied to switching devices Tr1 and Tr4. During the UV energizing period VL is HIGH and VU, WU, and WL are LOW.

The energizing control unit 100 also outputs the energizing state signals ST1 to ST6 to the reverse current detection unit 80.

Figure 5:
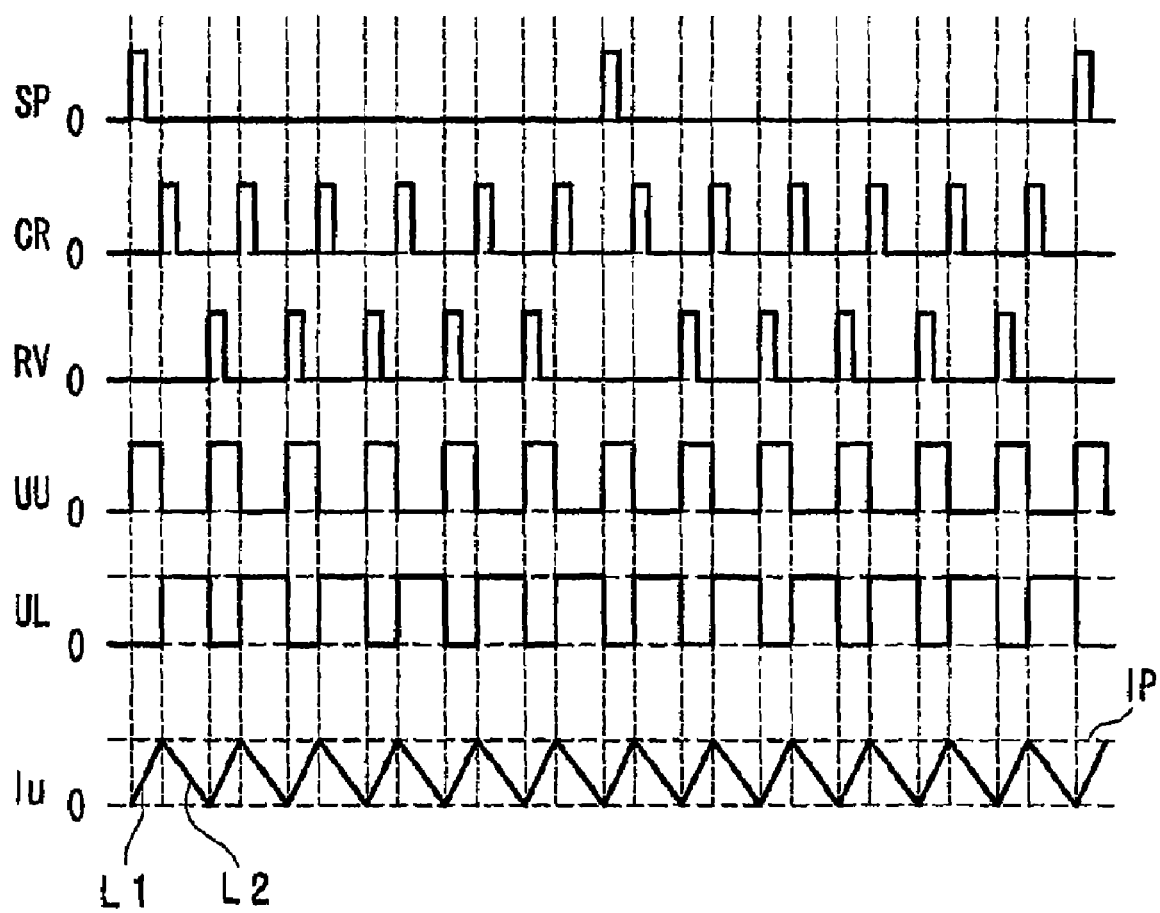
FIG. 5 is a timing chart describing the operation of the circuits shown in FIG. 4.

FIG. 5 is a timing chart describing operation of the circuit shown in FIG. 4 during the UV energizing period.

When the set signal SP goes HIGH in the UV energizing period, flip-flop 93 is set, and the output of the flip-flop 93 sets drive signal UU HIGH and drive signal UL LOW by way of the dead time generating unit 92 and energizing control unit 100. As a result, switching device Tr1 goes on, switching device Tr4 goes off, and the urging state is set. In the urging period the source current is supplied from the power supply 3 to motor coil Lu and sink current is supplied to motor coil Lv.

The U phase motor current Iu rises as indicated by line L1 in FIG. 5. Line L1 is actually a curve, and the average slope of the curve depends on the inductance and winding resistance of the motor coil.

The level of the U phase motor current Iu is converted by the detection resistance Rcs to current detection signal CS denoting a voltage, and is compared by the comparison unit 41 with the torque control signal EC. If the current detection signal CS level equals torque control signal EC, that is, if the U phase motor current Iu rises to maximum current IP, the reset signal CR goes HIGH and the flip-flop 93 is reset. As a result, drive signal UU goes LOW, drive signal UL goes HIGH, switching device Tr1 goes off, switching device Tr4 goes on, and the regeneration state, that is, the synchronous rectifier state, is assumed.

In the synchronous rectifier period the motor current flows through the current path of switching device Tr4, switching device Tr5, and motor coils Lu and Lv with the U phase being the source and the V phase being the sink side. This motor current attenuates over time as indicated by line L2 due to the effect of the coil resistance (not shown in the figure) of the motor 2, the inductance of the motor coils Lu and Lv, and the back electromotive force that is proportional to the speed of the motor 2. Line L2 is actually a curve, and the average slope of the curve depends on the back electromotive force level, that is, the rotational speed signal NR.

When the motor speed is sufficiently great relative to the torque control signal EC, that is, when the current component induced by the back electromotive force is sufficiently greater than the maximum current level IP determined by the torque control signal EC, the motor current begins to flow in the opposite direction with switching device Tr4 as the sink side and switching device Tr5 as the source side. The source voltage of switching device Tr5 therefore exceeds the drain voltage, and the operation of reverse current detection unit 80 causes the reverse current detection signal RV to go HIGH. As a result, the flip-flop 93 is set, switching device Tr4 goes off and switching device Tr1 goes on. This causes the urging state to be resumed, resets switching device Tr1 to the source and switching device Tr5 to the sync, supplies drive power to motor coils Lu and Lv, and the U phase motor current Iu begins to rise again.

The reverse current detection signal RV produced when the direction of motor current reverses actually causes the PWM frequency of the drive unit 10A to rise in the motor drive device according to this embodiment of the invention, but as the motor speed decreases, that is, as the back electromotive force attenuates, the PWM frequency decreases again to the normal PWM frequency.

More specifically, when the on voltage of the low potential side switching device of the sink phase during the urging period reverses in the synchronous rectifier period, the low potential side switching device that is the source phase in the urging period turns off and the high potential side switching device turns on, and energizing is controlled to resume the urging state. By thus controlling the logic level of the drive signal based on the reverse current detection signal RV, a regenerative motor current flowing through the motor coil in the opposite direction as during the urging period can be prevented in the synchronous rectifier period. A rise in the power supply voltage caused by the motor current flowing back to the power supply after the synchronous rectifier period can therefore be prevented.

The reverse current detection unit 80 in this first embodiment of the invention detects the direction of motor current flow during the synchronous rectifier period based on the on voltage polarity of the low potential side switching device for the phase that is the sink phase in the urging period. Alternatively, the reverse current detection unit 80 can detect the motor drive circuit during the synchronous rectifier period based on the on voltage polarity of the low potential side switching device for the phase that is the source phase in the urging period. The reverse current detection unit 80 is also not limited to the arrangements described above, and any arrangement that enables detecting the voltage polarity at a specific location in the motor current path formed during the synchronous rectifier period is included in the scope of the invention.

For brevity this embodiment of the invention is described using a 120° energizing control method, but other methods, such as 180° energizing, can be used to the same effect and can be described in the same way. More specifically, when a wide angle energizing method is used to drive the urging state, drive power is supplied to the motor 2 through one high potential side switching device on the source phase and two low potential side switching devices on sink phase, or drive power is supplied to the motor 2 through two high potential side switching devices on the source phase and one low potential side switching device on the sink phase. Various synchronous rectifier control patterns can be used in both cases, and any arrangement that detects if the direction of motor current in the synchronous rectifier period is opposite the motor current direction in the urging period based on the voltage polarity at a specific place on the motor current path and controls switching from the regeneration state to the urging state based on the result of this detection is included in the scope of the invention.

The motor drive device according to this first embodiment of the invention detects a change in the direction of current flow at a desired switching device on the current path of the motor current in the synchronous rectifier period, and controls energizing the motor coil based on the result of this detection. More specifically, the motor drive device detects when in the synchronous rectifier period the motor current begins to flow in the opposite direction as during the urging period, and changes energizing control from the synchronous rectifier state to the urging state.

This embodiment of the invention can therefore prevent the power supply voltage from rising as a result of the torque control signal or load variation causing motor current to flow back to the power supply. Capacitors and diodes for preventing a power supply voltage rise due to motor current backflow to the power supply are therefore not needed, and the cost and size of the motor drive device can be reduced.

Second Embodiment

A second embodiment of the invention is described below with reference to FIG. 6 and FIG. 7. This embodiment describes a variation of the PWM control unit 90A of the motor drive device and the arrangement for generating the drive signals UU-WL in the first embodiment. The motor drive device according to this second embodiment has a PWM control unit 90B that differs operationally from the PWM control unit 90A of the motor drive device 1 in the first embodiment. Other aspects of the arrangement and operation of this embodiment are the same as in the first embodiment. Note that like parts and signals in the motor drive device according to this second embodiment and the first embodiment are identified using the reference numerals shown in FIG. 1.

Figure 6:
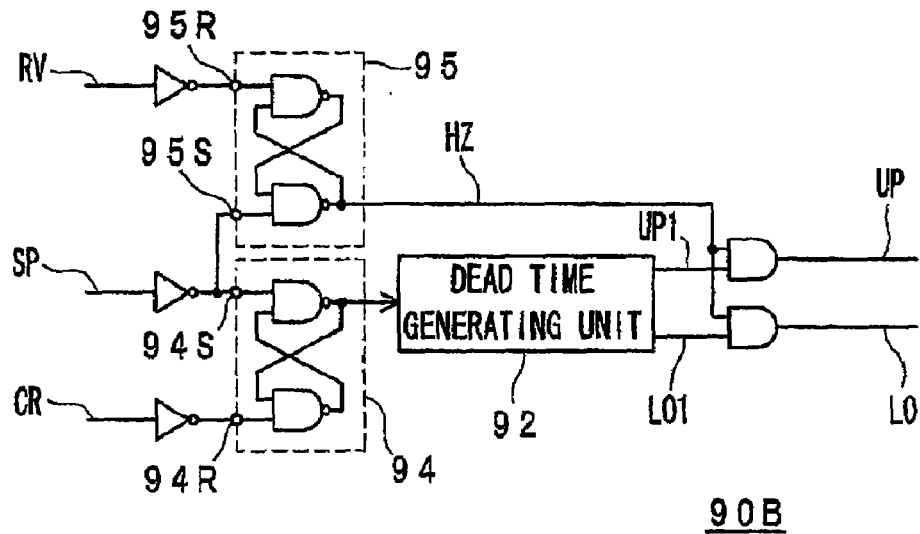
FIG. 6 is a circuit diagram of a PWM control unit 90B in the motor drive device according to a second embodiment of the invention.

FIG. 6 is a circuit diagram of the PWM control unit 90B. This PWM control unit 90B includes a dead time generating unit 92, flip-flop 94, and flip-flop 95. The inverted set signal SP is applied to the set pin 94S of flip-flop 94, and the inverted reset signal CR is applied to the reset pin 94R. The inverted set signal SP is applied to the set pin 95S of flip-flop 95, and the inverted reverse current detection signal RV is applied to the reset pin 95R.

Based on output from flip-flop 94, the dead time generating unit 92 generates high potential side drive signal UP1 and low potential side drive signal LO1 for a particular phase having a non-superimposed period for shoot-through prevention. The logical AND UP of UP1 and the outputs HZ of flip-flop 95, and the logical AND LO of HZ and LO1, are input to the energizing control unit 100. UP and LO are the high potential side drive signal and low potential side drive signal, respectively, of the drive unit 10A for a desired phase at a desired time.

Figure 7:
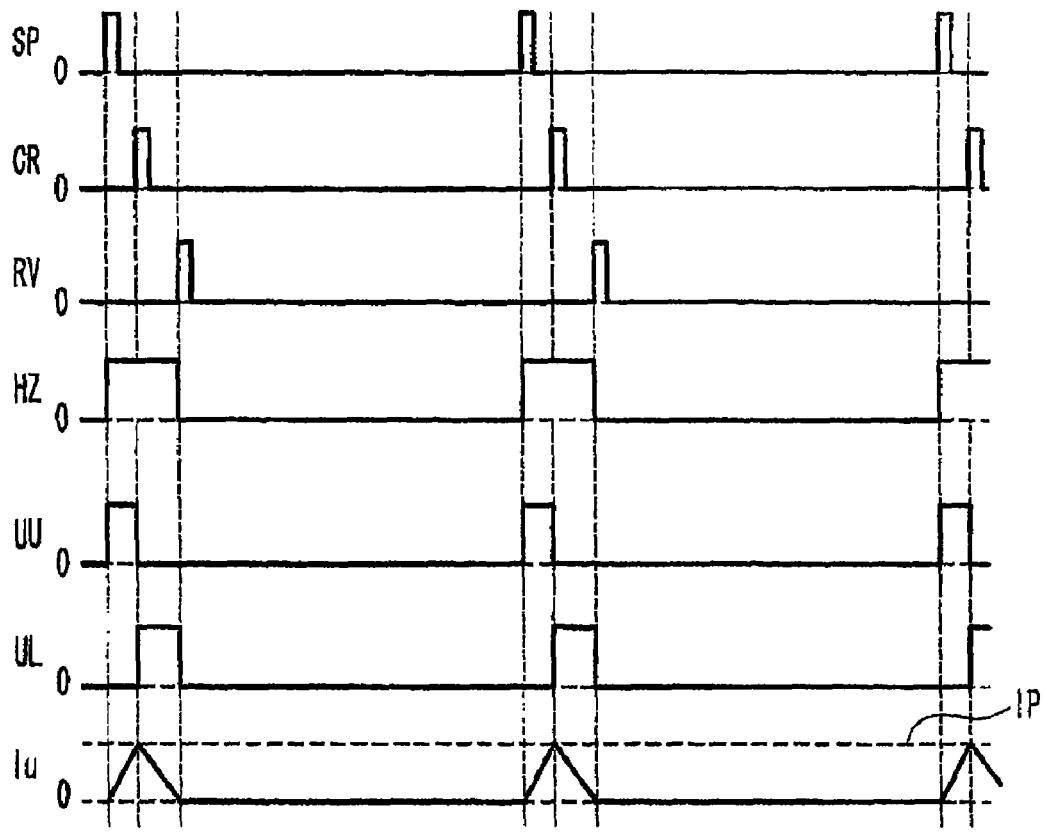
FIG. 7 is a timing chart describing the operation of the PWM control unit 90B in FIG. 6.

FIG. 7 is a timing chart describing the operation of the circuit shown in FIG. 6 in the UV energizing period. When the set signal SP goes HIGH at a certain time flip-flops 94 and 95 are set, the output of flip-flops 94 and 95 is therefore HIGH, the high potential side drive signal UP goes HIGH, and the low potential side drive signal LO goes LOW. More specifically, in the UV energizing period drive signal UU is HIGH and drive signal UL is LOW, switching device Tr1 is therefore on and switching device Tr4 is off, and the source current is supplied through switching device Tr1 to the motor coil Lu. Because drive signal VL is always HIGH in a 120° energizing system, sink current is supplied through switching device Tr5 to motor coil Lv. More specifically, the motor drive device 1 operates in the urging state in the urging period.

When the motor current rises to the maximum current level IP determined by the torque control signal EC, reset signal CR goes HIGH, flip-flop 94 is reset, drive signal UU therefore goes LOW and drive signal UL goes HIGH, and operation goes to the regeneration state, that is, the synchronous rectifier state. If the U phase is the source and the V phase is the sync, motor current in this synchronous rectifier period flows through the current path of switching devices Tr4 and Tr5 and motor coils Lu and Lv. This motor current attenuates over time due to the inductance of the motor coils Lu and Lv and winding resistance not shown of the motor 2, and the back electromotive force of a level proportional to the motor 2 speed.

When the motor speed is sufficiently great relative to the torque control signal EC, that is, when the current component induced by the back electromotive force is sufficiently greater than the maximum current level IP determined by the torque control signal EC, the motor current begins to flow in the opposite direction with switching device Tr4 as the sink side and switching device Tr5 as the source side. The source voltage of switching device Tr5 therefore exceeds the drain voltage, and the operation of reverse current detection unit 80 causes the reverse current detection signal RV to go HIGH. As a result, the flip-flop 95 is reset and signal HZ goes LOW. Drive signals UU and UL therefore go LOW, and the U phase enters a high impedance state in which both the high potential side switching device and low potential side switching device are off. The period for which this high impedance state is held is called the "high impedance period." The high impedance period is cleared when next set signal SP is input and the urging period is resumed.

In the first embodiment the urging period is automatically resumed when the reverse current detection signal RV goes HIGH in the synchronous rectifier period. In this second embodiment, however, the U phase is in a high impedance state when the reverse current detection signal RV goes HIGH in the synchronous rectifier period, and the urging period is resumed when the next set signal SP is input.

More specifically, when on voltage inversion of the low potential side switching device for the phase that is the sink phase in the urging period is detected in the synchronous rectifier period, energizing is controlled so that the high potential side switching device and low potential side switching device of the phase that is the source phase in the urging period turn off. As a result, motor current is prevented from flowing during the synchronous rectifier period in the opposite direction of current flow in the urging period. As a result, the power supply voltage is prevented from rising due to motor current flowing back to the power supply at the end of the synchronous rectifier period.

For brevity this embodiment of the invention is described using a 120° energizing control method, but other methods, such as 180° energizing, can be used to the same effect and can be described in the same way. More specifically any arrangement that detects if the direction of motor current in the synchronous rectifier period is opposite the motor current direction in the urging period based on the voltage polarity at a specific place on the motor current path and controls switching a specific phase from the synchronous rectifier state to the high impedance state based on the result of this detection is included in the scope of the invention.

The motor drive device according to this embodiment of the invention detects a change in the direction of current flow at a desired switching device on the current path of the motor current in the synchronous rectifier period, and controls the logic level of the drive signal based on the detected reverse current detection signal RV: More specifically, the motor drive device detects when in the synchronous rectifier period the motor current begins to flow in the opposite direction 20, as during the urging period, and changes energizing control from the synchronous rectifier state to the high impedance state.

This embodiment of the invention can therefore prevent the power supply voltage from rising as a result of the torque control signal or load variation causing motor current to flow back to the power supply. Capacitors and diodes for preventing a power supply voltage rise due to motor current backflow to the power supply are therefore not needed, and the cost and size of the motor drive device can be reduced.

Third Embodiment

A third embodiment of the invention is described below with reference to FIG. 8 and FIG. 9. This embodiment describes a variation of the PWM control unit 90A of the motor drive device and the arrangement for generating the drive signals UU-WL in the first embodiment. The motor drive device according to this third embodiment has a PWM control unit 90C that differs operationally from the PWM control unit 90A of the motor drive device 1 in the first embodiment. Other aspects of the arrangement and operation of this embodiment are the same as in the first embodiment. Note that like parts and signals in the motor drive device according to this second embodiment and the first embodiment are identified using the reference numerals shown in FIG. 1.

Figure 8:
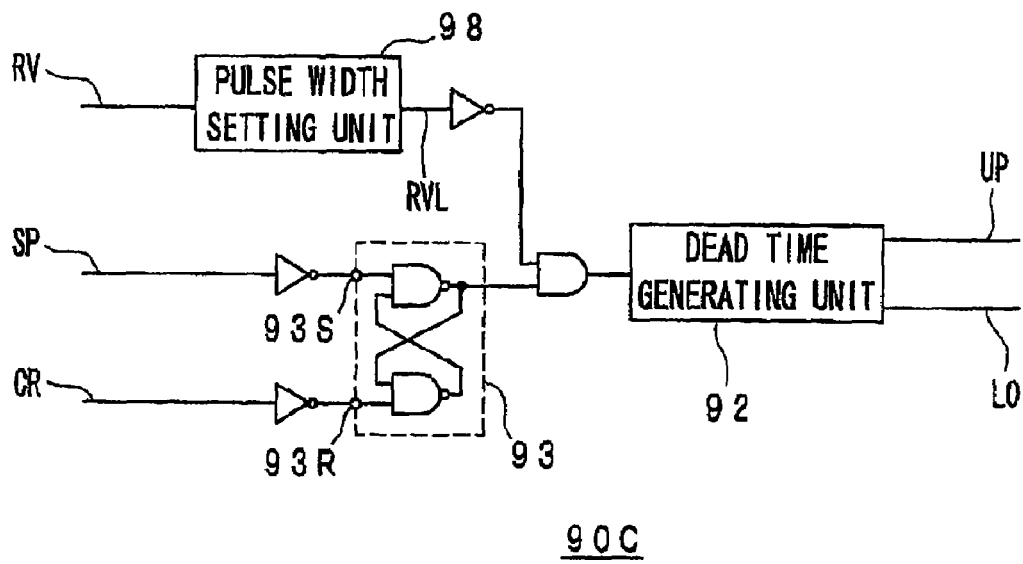
FIG. 8 is a circuit diagram of a PWM control unit 90C according to a third embodiment of the invention.

FIG. 8 is a circuit diagram of the PWM control unit 90C. This PWM control unit 90C includes a dead time generating unit 92, pulse width setting unit 98, and flip-flop 93.

When the reverse current detection signal RV input to the pulse width setting unit 98 is HIGH, the pulse width setting unit 98 outputs a pulse width setting unit signal RVL that goes HIGH for a first predetermined period TL1. The pulse width setting unit 98 can be rendered using a multivibrator. The first predetermined period TL1 can be a constant value, variable according to the speed of rotation, or a value determined according to a specific electrical angle based on the position detection signal or the timing when the energizing pattern changes. The inverted set signal SP is applied to the set pin 93S of flip-flop 93, and the inverted reset signal CR is applied to the reset pin 93R.

Based on the logical AND of the flip-flop 93 output and the inverted pulse width setting unit signal RVL, the dead time generating unit 92 generates high potential side drive signal UP and low potential side drive signal LO for a particular phase having a non-superimposed period for shoot-through prevention, and outputs drive signals UP and LO to the energizing control unit 100.

Figure 9:
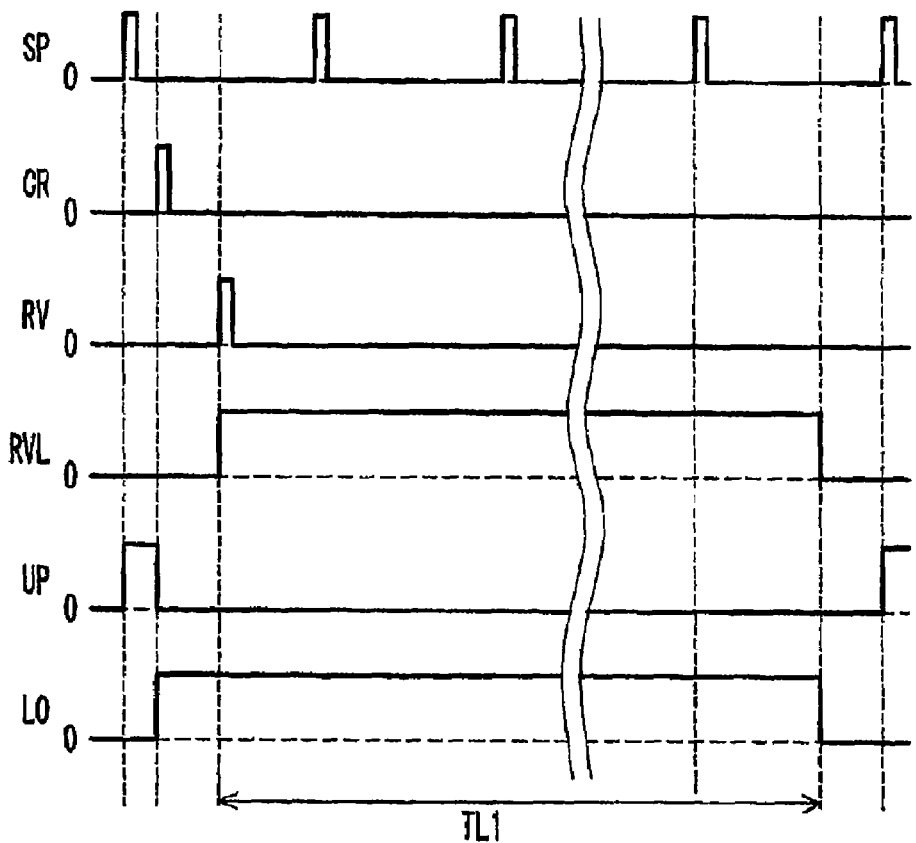
FIG. 9 is a timing chart describing the operation of the PWM control unit 90C in FIG. 8.

FIG. 9 is a timing chart describing the operation of the circuit shown in FIG. 8 in the UV energizing period. When the set signal SP goes HIGH at a certain time flip-flop 93 is set, the high potential side drive signal UP goes HIGH, and the low potential side drive signal LO goes LOW. More specifically, in the UV energizing period drive signal UU is HIGH and drive signal UL is LOW, switching device Tr1 is therefore on and switching device Tr4 is off, and the source current is supplied through switching device Tr1 to the motor coil Lu. Because drive signal VL is always HIGH in a 120° energizing system, sink current is supplied through switching device Tr5 to motor coil Lv. More specifically, the motor drive device 1 operates in the urging state in the urging period.

When the motor current rises to the maximum current level IP determined by the torque control signal EC, reset signal CR goes HIGH, flip-flop 93 is reset, drive signal UU therefore goes LOW and drive signal UL goes HIGH, and operation goes to the regeneration state, that is, the synchronous rectifier state. If the U phase is the source and the V phase is the sync, motor current in this synchronous rectifier period flows through the current path of switching devices Tr4 and Tr5 and motor coils Lu and Lv. This motor current attenuates over time due to the inductance of the motor coils Lu and Lv and winding resistance not shown of the motor 2, and the back electromotive force of a level proportional to the motor 2 speed.

When the motor speed is sufficiently great relative to the torque control signal EC, that is, when the current component induced by the back electromotive force is sufficiently greater than the maximum current level IP determined by the torque control signal EC, the motor current begins to flow in the opposite direction with switching device Tr4 as the sink side and switching device Tr5 as the source side. The source voltage of switching device Tr5 therefore exceeds the drain voltage, and the operation of reverse current detection unit 80 causes the reverse current detection signal RV to go HIGH. As a result, the pulse width setting unit 98 outputs the pulse width setting unit signal RVL HIGH for first predetermined period TL1. The high potential side drive signal UP is held LOW and low potential side drive signal LO is held HIGH while pulse width setting unit signal RVL is HIGH. The motor drive device 1 therefore operates in the synchronous rectifier state, and this state continues for first predetermined period TL1.

When the pulse width setting unit signal RVL goes LOW, flip-flop 93 output is enabled and the normal energizing control state is reset.

The first predetermined period TL1 can be up to twice the time constant of the motor current path.

More specifically, when on voltage inversion of the low potential side switching device for the phase that is the sink phase in the urging period is detected in the synchronous rectifier period, energizing is controlled so that the synchronous rectifier period continues for a predetermined time up to twice the time constant of the motor current path. The back electromotive force produced in the motor coil attenuates during the synchronous rectifier period as a result of a drop in the motor speed and the impedance component that depends on the on resistance of the switching devices and the motor coil. Motor current flowing in the opposite direction as during the urging period therefore decreases if the synchronous rectifier period is sustained long enough for the back electromotive force to attenuate. As a result, the power supply voltage is prevented from rising due to motor current flowing back to the power supply at the end of the synchronous rectifier period.

For brevity this embodiment of the invention is described using a 120° energizing control method, but other methods, such as 180° energizing, can be used to the same effect and can be described in the same way. More specifically, any arrangement that detects if the direction of motor current in the synchronous rectifier period is opposite the motor current direction in the urging period based on the voltage polarity at a specific place on the motor current path and controls maintaining the synchronous rectifier period for a predetermined time based on the result of this detection is included in the scope of the invention.

The motor drive device according to this embodiment of the invention detects a change in the direction of current flow at a desired switching device on the current path of the motor current in the synchronous rectifier period, and controls the logic level of the drive signal based on the detected reverse current detection signal RV. More specifically, when the motor drive device detects in the synchronous rectifier period that the motor current begins to flow in the opposite direction as during the urging period, the motor drive device changes energizing control so that the synchronous rectifier period continues for a predetermined time until the motor current induced by the back electromotive force decreases to a level that the current does not cause a rise in the power supply voltage.

This embodiment of the invention can therefore prevent the power supply voltage from rising as a result of the torque control signal or load variation causing motor current to flow back to the power supply. Capacitors and diodes for preventing a power supply voltage rise due to motor current backflow to the power supply are therefore not needed, and the cost and size of the motor drive device can be reduced.

Fourth Embodiment

A fourth embodiment of the invention is described below with reference to FIG. 10 and FIG. 11. This embodiment describes a variation of the PWM control unit 90A of the motor drive device and the arrangement for generating the drive signals UU-WL in the first embodiment. The motor drive device according to this fourth embodiment has a PWM control unit 90D that differs operationally from the PWM control unit 90A of the motor drive device 1 in the first embodiment. Other aspects of the arrangement and operation of this embodiment are the same as in the first embodiment. Note that like parts and signals in the motor drive device according to this fourth embodiment and the first embodiment are identified using the reference numerals shown in FIG. 1.

Figure 10:
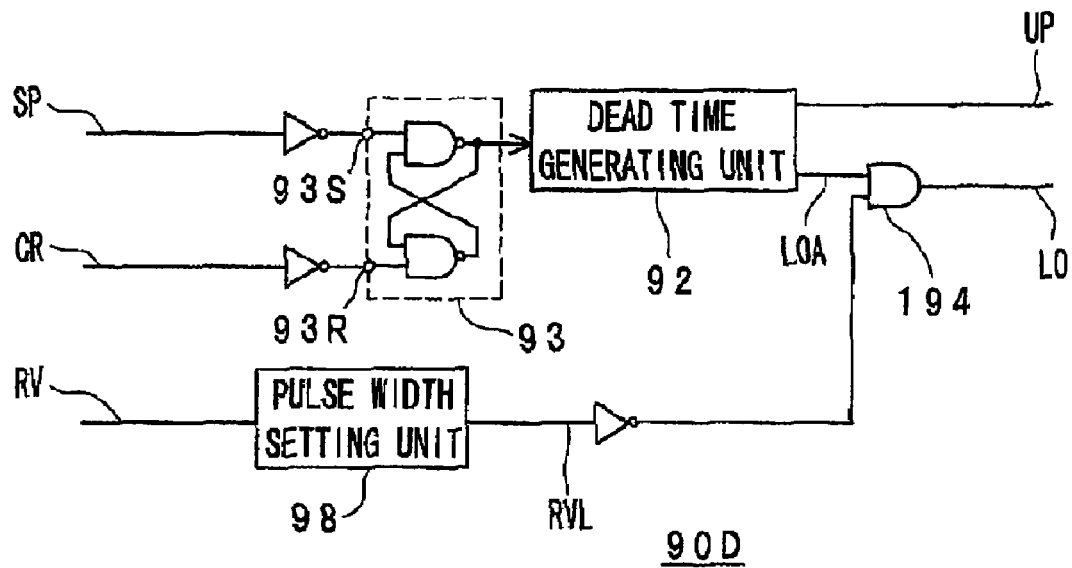
FIG. 10 is a circuit diagram of a PWM control unit 90D according to a fourth embodiment of the invention.

FIG. 10 is a circuit diagram of the PWM control unit 90D. This PWM control unit 90D includes a dead time generating unit 92, pulse width setting unit 98, and flip-flop 93.

When the reverse current detection signal RV input to the pulse width setting unit 98 is HIGH, the pulse width setting unit 98 outputs a pulse width setting unit signal RVL that goes HIGH for a second predetermined period TL2. The pulse width setting unit 98 can be rendered using a multivibrator or flip-flop. The second predetermined period TL2 can be a constant value, variable according to the speed of rotation, or a value determined according to a specific electrical angle based on the position detection signal or the timing when the energizing pattern changes. The inverted set signal SP is applied to the set pin 93S of flip-flop 93, and the inverted reset signal CR is applied to the reset pin 93R.

Based on the flip-flop 93 output, the dead time generating unit 92 generates high potential side drive signal UP and low potential side drive signal LOA for a particular phase having a non-superimposed period for shoot-through prevention. The inverted pulse width setting unit signal RVL and low potential side drive signal LOA are input to AND 194, and AND 194 outputs low potential side drive signal LO. Drive signals UP and LO are output to the energizing control unit 100.

Figure 11:
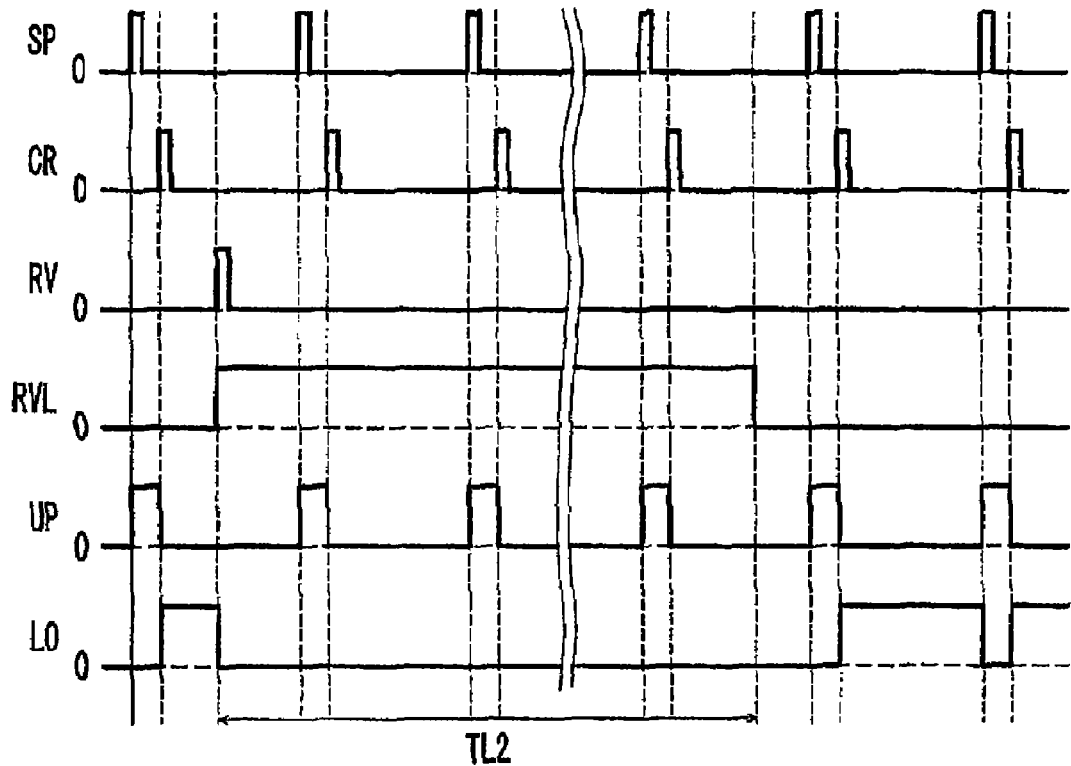
FIG. 11 is a timing chart describing the operation of the PWM control unit 90D in FIG. 10.

FIG. 11 is a timing chart describing the operation of the circuit shown in FIG. 10. When the set signal SP goes HIGH at a certain time flip-flop 93 is set, the high potential side drive signal UP goes HIGH, and the low potential side drive signal LO goes LOW. More specifically, in the UV energizing period drive signal UU is HIGH and drive signal UL is LOW, switching device Tr1 is therefore on and switching device Tr4 is off, and the source current is supplied through switching device Tr1 to the motor coil Lu. Because drive signal VL is always HIGH in a 120° energizing system, sink current is supplied through switching device Tr5 to motor coil Lv. More specifically, the motor drive device 1 operates in the urging state in the urging period.

When the motor current rises to the maximum current level IP determined by the torque control signal EC, reset signal CR goes HIGH, flip-flop 93 is reset, drive signal UU therefore goes LOW and drive signal UL goes HIGH, and operation goes to the regeneration state, that is, the synchronous rectifier state. If the U phase is the source and the V phase is the sync, motor current in this synchronous rectifier period flows through the current path of switching devices Tr4 and Tr5 and motor coils Lu and Lv. This motor current attenuates over time due to the inductance of the motor coils Lu and Lv and winding resistance not shown of the motor 2, and the back electromotive force of a level proportional to the motor 2 speed.

When the motor speed is sufficiently great relative to the torque control signal EC, that is, when the current component induced by the back electromotive force is sufficiently greater than the maximum current level IP determined by the torque control signal EC, the motor current begins to flow in the opposite direction with switching device Tr4 as the sink side and switching device Tr5 as the source side. The source voltage of switching device Tr5 therefore exceeds the drain voltage, and the operation of reverse current detection unit 80 causes the reverse current detection signal RV to go HIGH. As a result, the pulse width setting unit 98 outputs the pulse width setting unit signal RVL HIGH for second predetermined period TL2. The low potential side drive signal LO is fixed LOW while pulse width setting unit signal RVL is HIGH. In other words, switching device Tr4 is off in the UV energizing period. The drive unit 10A therefore applies PWM drive using only the high potential side switching device for the source phase, and synchronous rectifier control is not applied during the regeneration period. This state continues for second predetermined period TL2.

When the pulse width setting unit signal RVL then goes LOW, the low potential side drive signal LOA output from the dead time generating unit 92 is enabled, and energizing control including a normal synchronous rectifier state is resumed.

More specifically, when on voltage inversion of the low potential side switching device for the phase that is the sink phase in the urging period is detected in the synchronous rectifier period, PWM drive switches only the high potential side switching device of the source phase in the urging period on/off for a predetermined time, and energizing is controlled so that the low potential side switching device is always off. In other words, synchronous rectifier control is not applied for a predetermined time after a reverse current is detected. This control method causes the motor current during the regeneration period to pass through a path having a diode in a reverse parallel connection to the low potential side switching device instead of a path through the low potential side switching device of the phase that is on the source side in the urging period. The diode that is reverse-parallel connected to the low potential side switching device is thus reverse biased to the back electromotive force. This suppresses an increase in the motor current produced by the back electromotive force, and prevents a rise in the power supply voltage due to motor current flowing back to the power supply.

Alternatively, when synchronous rectifier control is applied by passing the motor current through the high potential side switching device of the phase that is the source phase in the urging period and the high potential side switching device of the phase that is the sink phase during the urging period, energizing can be controlled so that only the low potential side switching device of the phase that is the sink phase in the urging period is PWM driven when the motor current is detected to be flowing in the synchronous rectifier period in the opposite direction as in the urging period.

For brevity this embodiment of the invention is described using a 120° energizing control method, but other methods, such as 180° energizing, can be used to the same effect and can be described in the same way. More specifically, any arrangement that detects if the direction of motor current in the synchronous rectifier period is opposite the motor current direction in the urging period based on the voltage polarity at a specific place on the motor current path and does not apply synchronous rectifier control for a predetermined time based on the result of this detection is included in the scope of the invention.

This fourth embodiment of the invention describes a motor drive device that uses current controlled PWM drive, but the invention is not so limited and can be applied to motor drive devices that use voltage controlled PWM drive. The specific arrangement used for voltage controlled PWM drive with a synchronous rectifier period is not particularly limited insofar as the arrangement detects that the direction of motor current in the synchronous rectifier period is opposite the direction of motor current in the urging period based on the voltage polarity at a specific point in the motor current path, and does not apply synchronous rectifier control for a predetermined time based on this detection result.

The motor drive device according to this embodiment of the invention detects a change in the direction of current flow at a desired switching device on the current path of the motor current in the synchronous rectifier period, and controls the logic level of the drive signal based on the detected reverse current detection signal RV. More specifically, when the motor drive device detects in the synchronous rectifier period that the motor current begins to flow in the opposite direction as during the urging period, the motor drive device changes energizing control so that the synchronous rectifier control is not applied for a predetermined time.

This embodiment of the invention can therefore prevent the power supply voltage from rising as a result of the torque control signal or load variation causing motor current to flow back to the power supply. Capacitors and diodes for preventing a power supply voltage rise due to motor current backflow to the power supply are therefore not needed, and the cost and size of the motor drive device can be reduced.

Fifth Embodiment

A fifth embodiment of the invention is described below with reference to FIG. 12 and FIG. 13. This embodiment describes a variation of the drive unit 10A of the motor drive device in the first embodiment. The motor drive device according to this embodiment has a drive unit 10B that differs operationally from the drive unit 10A of the motor drive device 1 in the first embodiment, and additionally has a detected phase control unit 70. Other aspects of the arrangement and operation of this embodiment are the same as in the first embodiment. The arrangement of the PWM control unit 90A can be the PWM control unit 90B described in the second embodiment or the PWM control unit 90C described in the third embodiment. Note that like parts and signals in the motor drive device according to this fifth embodiment and the first embodiment are identified using the reference numerals shown in FIG. 1.

Figure 12:
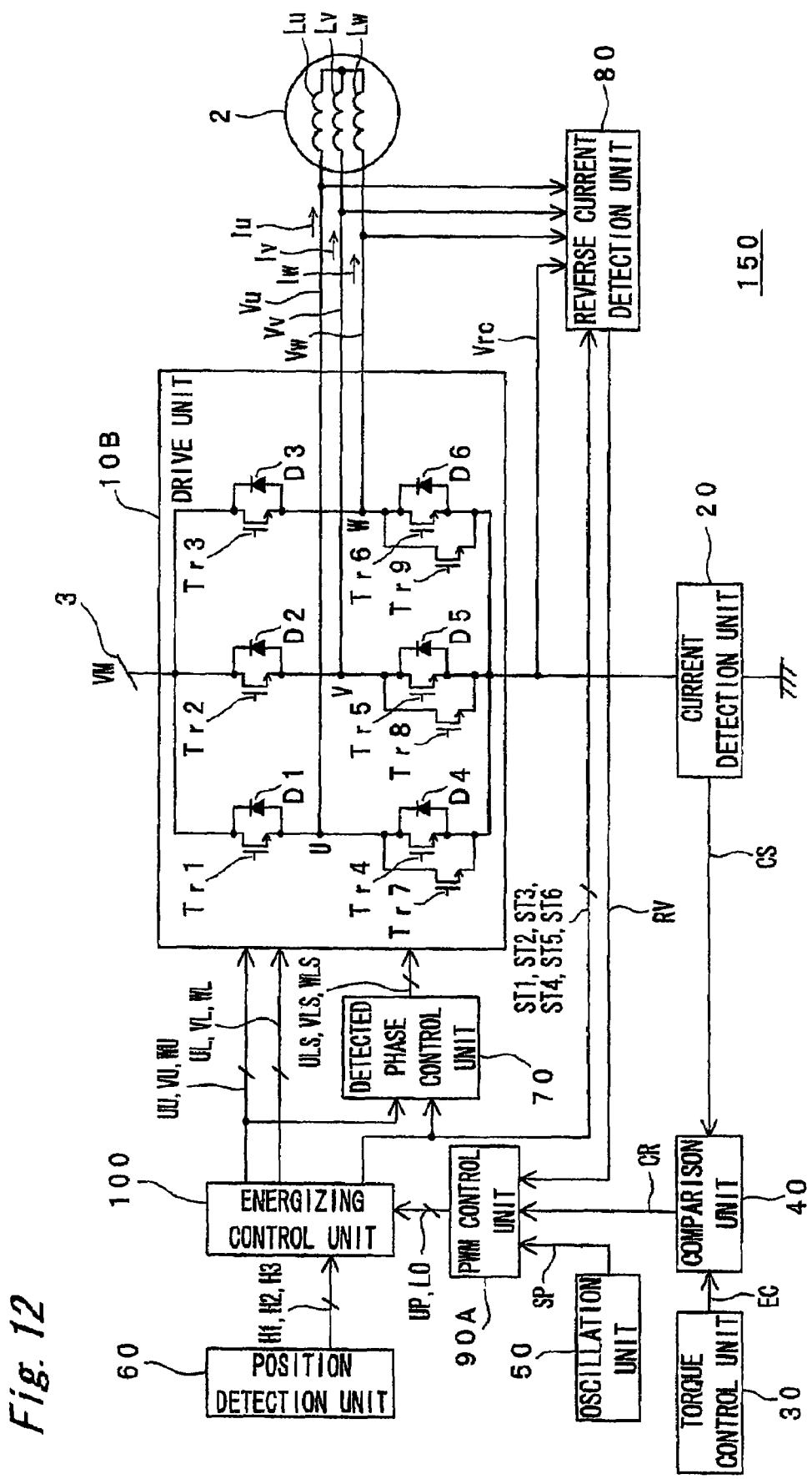
FIG. 12 is a block diagram of a motor drive device 150 according to a fifth embodiment of the invention.

FIG. 12 is a block diagram of a motor drive device 150 according to this fifth embodiment of the invention.

The drive unit 10B is composed of six switching devices Tr1 to Tr6 in a bridge connection, and a diode D1, D2, D3, D4, D5, D6 is reverse parallel connected to each of the switching devices Tr1 to Tr6. Switching devices Tr7, Tr8, Tr9 are parallel connected to the low potential side switching devices Tr4, Tr5, Tr6. The parallel on resistance of the two low potential side switching devices in each phase is effectively equal to the on resistance of the high potential side switching devices Tr1, Tr2, Tr3 for each phase.

One terminal of motor coil Lu is connected to the node between switching device Tr1 and switching device Tr4, one terminal of motor coil Lv is connected to the node between switching device Tr2 and switching device Tr5, and one terminal of motor coil Lw is connected to the node between switching device Tr3 and switching device Tr6 in this drive unit 10B. Switching devices Tr1 to Tr6 switch on/off according to the logic level of the drive signals UU-WL from the energizing control unit 100, and supply PWM switched drive power from the power supply 3 to the motor coils Lu. Lv, Lw. Switching devices Tr7, Tr8, Tr9 switch on/off according to the drive signals ULS, VLS, WLS from the detected phase control unit 70, and supply drive power from the power supply 3 to the motor coils Lu, Lv, Lw for each phase of the motor 2. A field effect transistor, bipolar transistor, or insulated gate bipolar transistor (IGBT), for example, can be used for switching devices Tr1 to Tr9.

The detected phase control unit 70 generates the drive signals ULS, VLS, WLS for driving the switching devices Tr7, Tr8, Tr9 based on the high potential side drive signals UU, VU, WU and energizing state signals ST1 to ST6, and outputs the drive signals ULS, VLS, WLS to the drive unit 10B.

Figure 13:
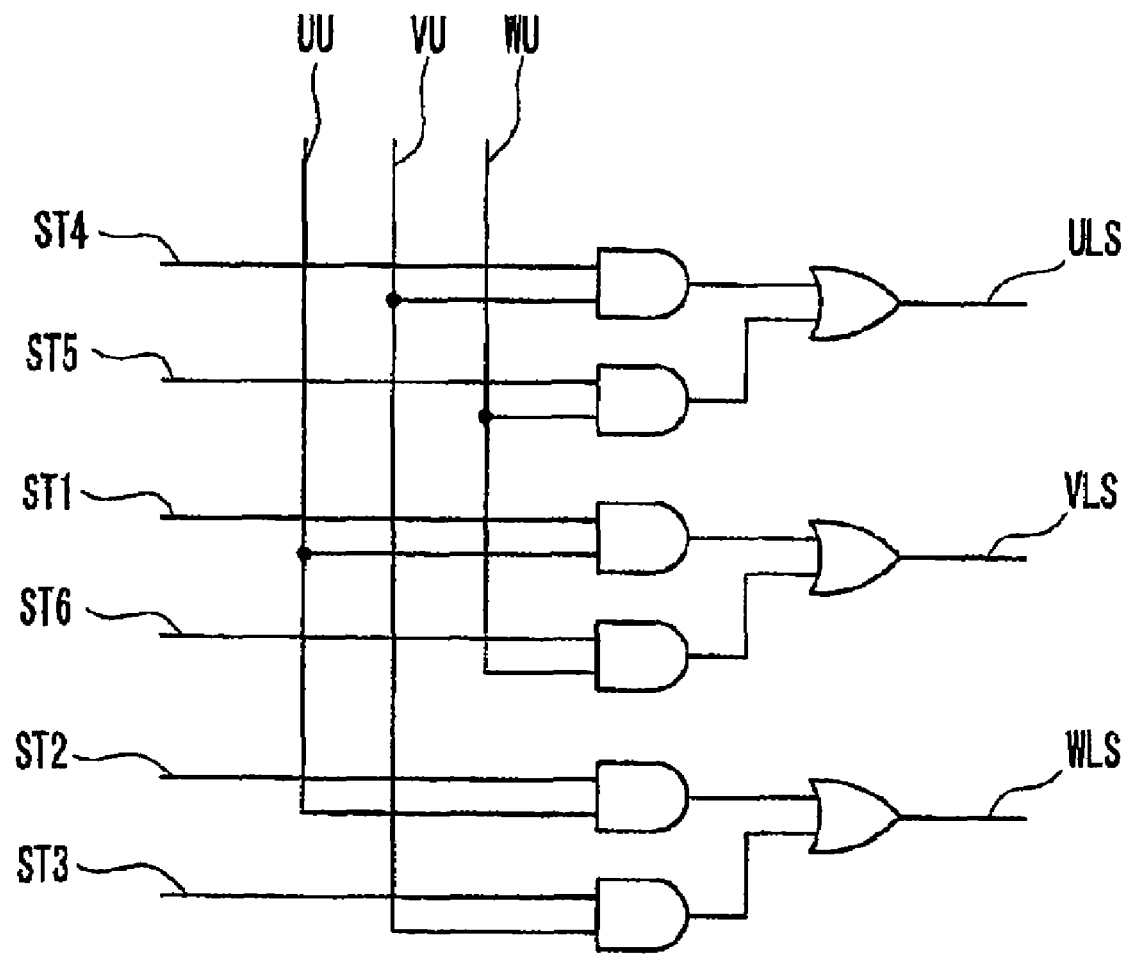
FIG. 13 is a circuit diagram of the detected phase control unit 70 in FIG. 12.

FIG. 13 is a circuit diagram of the detected phase control unit 70. During the urging period of the drive unit 10B, that is, while the source phase high potential side switching devices are on, the detected phase control unit 70 turns the switching device Tr7, Tr8, Tr9 for the sink phase on. During the regeneration period, the switching device Tr7, Tr8, Tr9 for the sink phase is off, and only one of the two parallel-connected low potential side switching devices is turned on for the sink phase.

Figure 14:
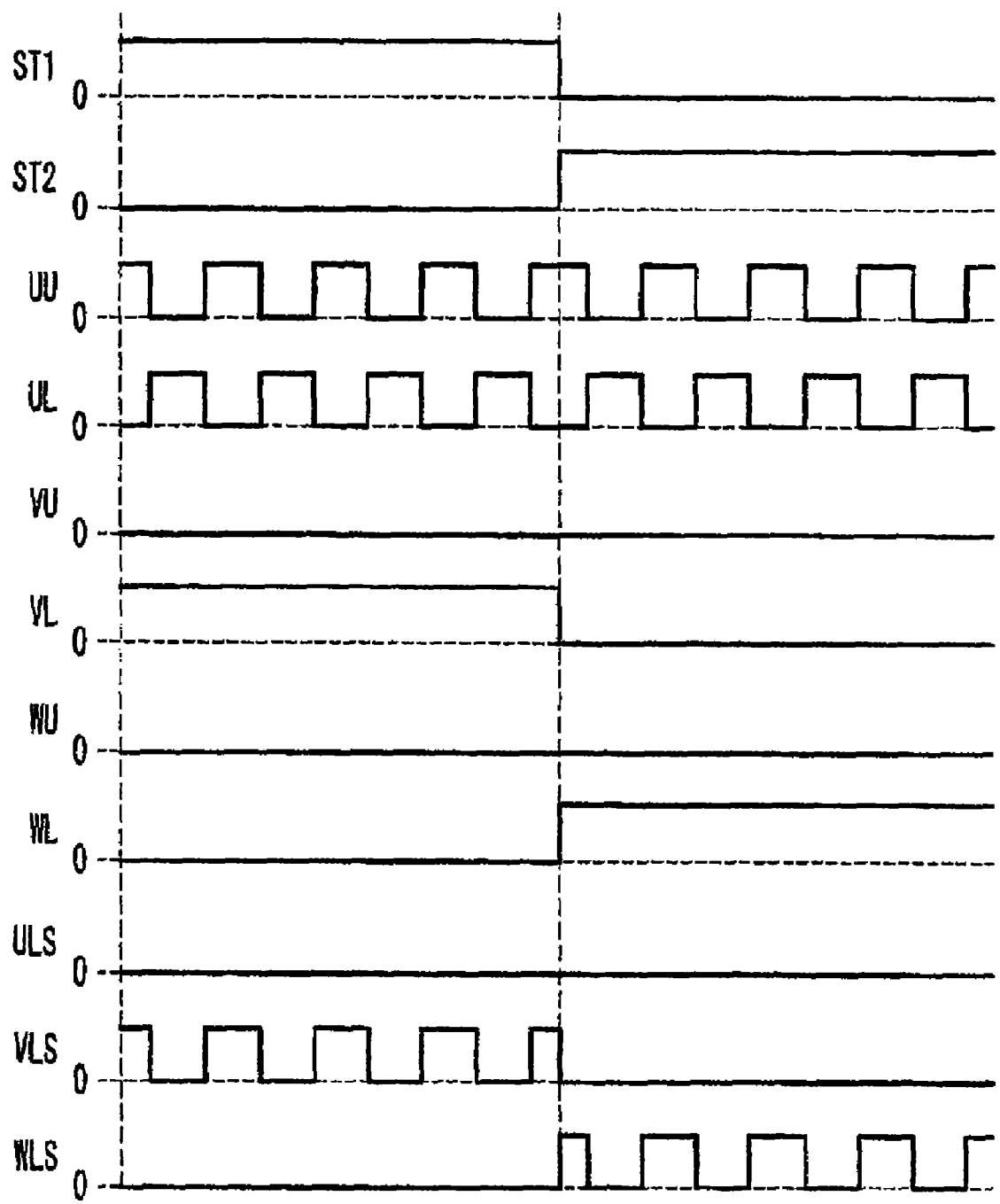
FIG. 14 is a timing chart describing the operation of the detected phase control unit 70 in FIG. 13.
Figure 15:
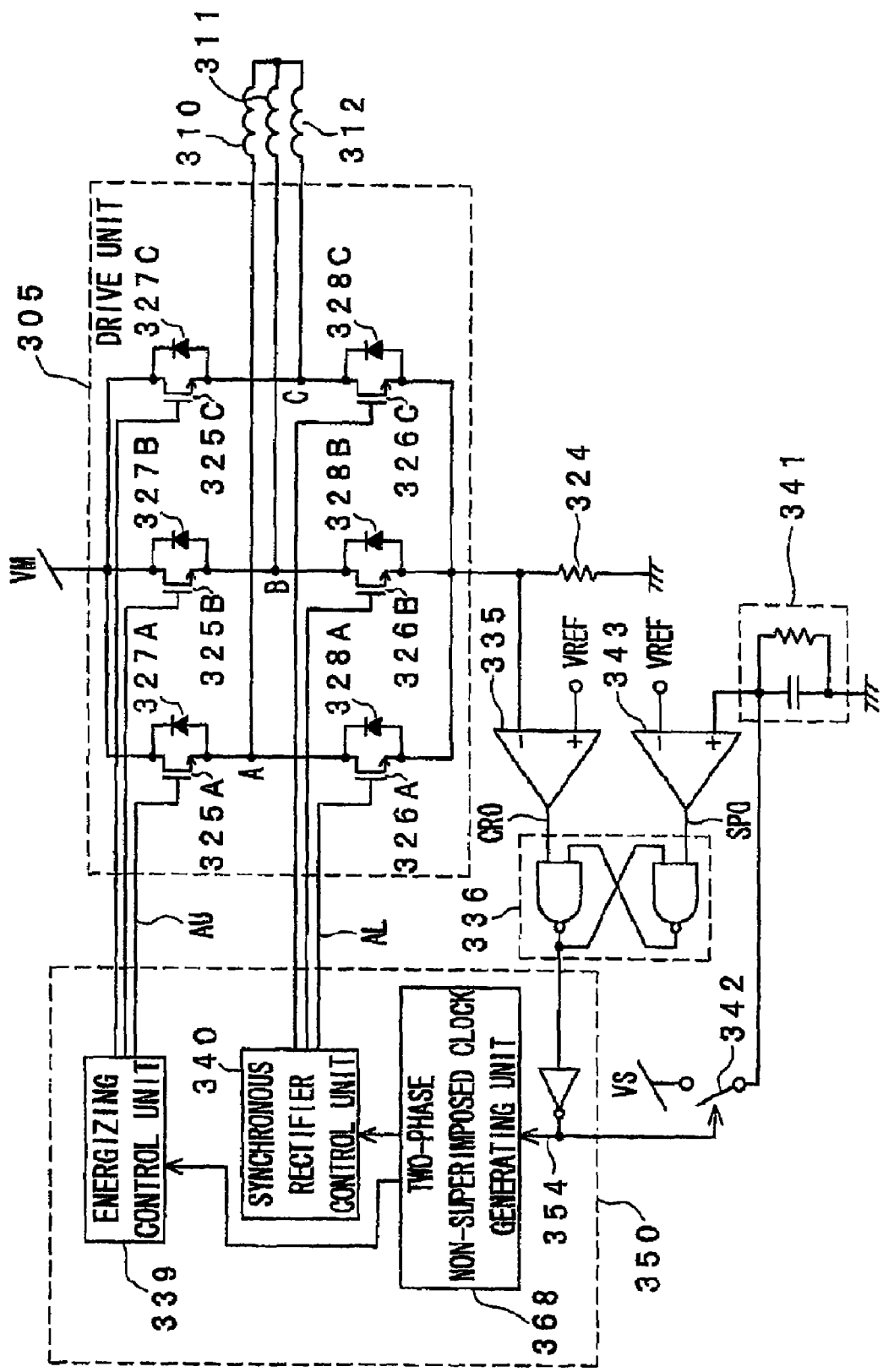
FIG. 15 is a block diagram of a motor drive device according to the related art.
Figure 16:
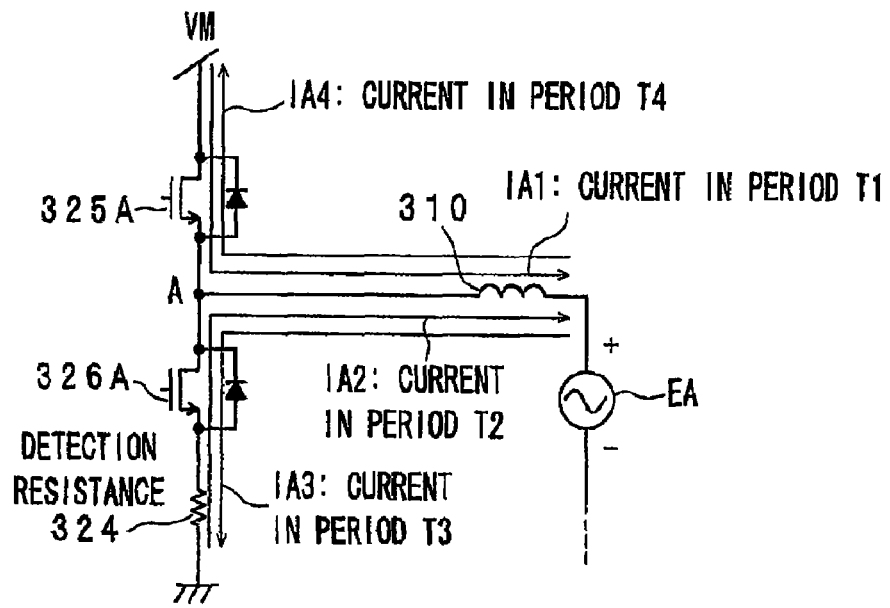
FIG. 16 is a circuit diagram describing the direction of flow of the phase A motor current in the motor drive device of the related art shown in FIG. 15.
Figure 17:
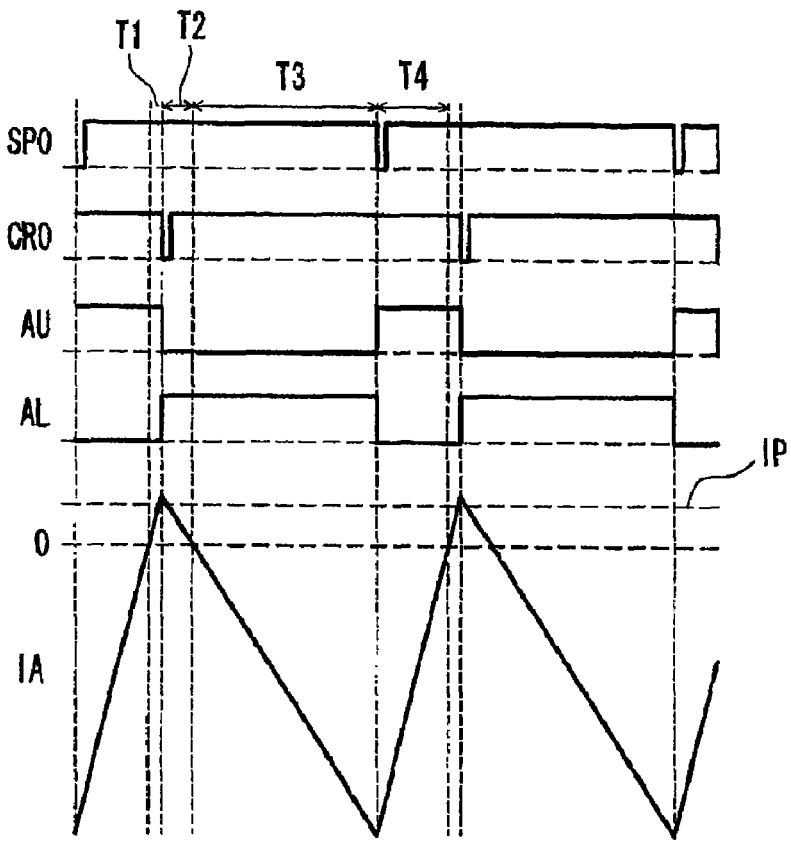
FIG. 17 is a timing chart describing the direction of flow of the phase A motor current in the motor drive device of the related art shown in FIG. 15.

FIG. 14 is a timing chart describing the operation of the circuit shown in FIG. 13 during the UV energizing period and UW energizing period.

In the UV energizing period, for example, the drive signal VLS for switching device Tr8 in the sink phase switches on/off synchronized to the drive signal UU for the switching device Tr1 of the source phase. More specifically, in the urging period switching device Tr8 and switching device Tr5 turn on with an on resistance equal to the on resistance of the high potential side switching devices. In the regeneration period, switching device Tr8 turns off and the parallel on resistance of switching devices Tr5 and Tr8 rises. Because the on voltage at both ends of the switching devices where current is detected rises, the direction of motor current flow in the regeneration period can be easily detected.

This embodiment of the invention is not so limited, however, and the direction of motor current flow in the regeneration period can alternatively be detected based on the on voltage of the low potential side switching device of the source phase during the urging period. In this case the one switching device Tr7, Tr8, Tr9 for the source phase in the urging period is turned off in the regeneration period.

Further alternatively, synchronous rectifier control may be applied by setting the high potential side switching device of the phase on the source side in the urging period and the high potential side switching device of the phase on the sink side in the urging period on in the regeneration period. In this case, switching devices Tr7, Tr8, Tr9 are parallel connected to the high potential side switching devices Tr1, Tr2, Tr3. To detect the on voltage to know the direction of the motor current, the switching device Tr7, Tr8, Tr9 connected to the phase used for on voltage detection is turned off. This achieves the effect of the invention even in arrangements in which the on voltage at both ends of the switching device used for on voltage detection is high.

The invention is thus not limited to the foregoing arrangements and the effect of the invention can be achieved by any arrangement in which detecting the direction of motor current flow is made easier by increasing the on voltage at both ends of a specific switching device on the path of the motor current.

As described above, detecting the direction of motor current flow is made easier by increasing the on voltage at both ends of a specific switching device on the path of the motor current in the regeneration period. This fifth embodiment of the invention can thus improve the reliability of the effect of the first to fourth embodiments prevent the power supply voltage from rising due to motor current flowing back to the power supply.

This fifth embodiment of the invention describes a motor drive device that uses current controlled PWM drive, but the invention is not so limited and can be applied to motor drive devices that use voltage controlled PWM drive. The specific arrangement used for voltage controlled PWM drive with a synchronous rectifier period is not particularly limited insofar as the arrangement facilitates detecting the direction of motor current flow in the regeneration period by increasing the on voltage at both ends of a specific switching device on the path of the motor current in the regeneration period.

This embodiment of the invention can therefore prevent the power supply voltage from rising as a result of the torque control signal or load variation causing motor current to flow back to the power supply. Capacitors and diodes for preventing a power supply voltage rise due to motor current backflow to the power supply are therefore not needed, and the cost and size of the motor drive device can be reduced.

The invention is described herein using a three-phase motor by way of example, but the invention can be used with an N-phase motor (where N is an integer of 2 of more) with the same effect. The foregoing embodiments of the invention also simply describe the invention specifically and the invention is not limited to these examples.

The present invention can be used as a motor drive device and a motor drive method.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A motor drive device operable to supply drive power to a motor by switching repeatedly between an urging state and a regeneration state, comprising:
   a drive signal generator operable to generate a drive signal;
   a driver having high potential side switching devices for N phases (where N is an integer greater than or equal to 2) and low potential side switching devices for N phases, said driver being operable to produce the drive power as a result that the high potential side switching devices for N phases and the low potential side switching devices for N phases are controlled by the drive signal;
   a reverse current detector connected in parallel to either the high potential side switching devices for N phases or the low potential side switching devices for N phases, said reverse current detector being operable to detect, based on the polarity of the on voltage of said switching devices connected to said reverse current detector, a time when the direction of motor current flowing through the motor reverses in the regeneration state and to generate a reverse current detection signal;

a current detection unit operable to detect the motor current level of the motor and to output a current detection signal; and a torque control signal generator operable to generate a torque control signal setting the motor torque;

wherein said drive signal generator controls the logic level of the drive signal based on this reverse current detection signal; and said drive signal generator controls the logic level of the drive signal based on the difference between the current detection signal and the torque control signal.

2. The motor drive device described in claim 1, wherein:

said drive signal generator produces N-phase high potential side drive signals operable to control the N-phase high potential side switching devices, respectively, and N-phase low potential side drive signals operable to control the N-phase low potential side switching devices, respectively; and in the urging state for any single phase, the high potential side drive signal is set to an operating state level and the low potential side drive signal is set to a non-operating state level, or the high potential side drive signal is set to a non-operating state level and the low potential side drive signal is set to an operating state level.

3. The motor drive device described in claim 2, wherein said drive signal generator controls the logic level of the high potential side drive signal and low potential side drive signal for at least one phase to the logic level of the urging state when the reverse current detection signal is output.

4. The motor drive device described in claim 2, wherein said drive signal generator controls the logic level of both the high potential side drive signal and low potential side drive signal for at least one phase to the non-operating state level when the reverse current detection signal is output.

5. The motor drive device described in claim 2, wherein said drive signal generator holds the logic level of the high potential side drive signal and low potential side drive signal for at least one phase to the logic level of the state just before the reverse current detection signal was output for a first predetermined time when the reverse current detection signal is output.

6. The motor drive device described in claim 2, wherein said drive signal generator controls the logic level of either the high potential side drive signal or low potential side drive signal for at least one phase to the non-operating state level for a second predetermined time when the reverse current detection signal is output.

7. The motor drive device described in claim 2, wherein said driver outputs the on voltage of the switching device for at least one phase selected from a group of N-phase high potential side switching devices or a group of N-phase low potential side switching devices; and said reverse current detector generates the reverse current detection signal based on a comparison of the on voltage and a predetermined voltage.

8. The motor drive device described in claim 7, wherein said driver comprises a separate switching device parallel connected to the switching device for at least one phase in at least one group of switching devices, and sets the separate switching device to the non-operating state in the regeneration state.

* * * * *

UNITED STATES PATENT AND TRADEMARK OFFICE
CERTIFICATE OF CORRECTION

PATENT NO. : 7,622,873 B2
APPLICATION NO. : 11/548495
DATED : November 24, 2009
INVENTOR(S) : Takata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 395 days.

Signed and Sealed this

Fourteenth Day of December, 2010

David J. Kappos
*Director of the United States Patent and Trademark Office*